United States Patent
Bai et al.

(10) Patent No.: US 12,519,526 B2
(45) Date of Patent: Jan. 6, 2026

(54) TRANSMIT-BEAM PREDICTION

(71) Applicant: QUALCOMM Incorporated, San Diego, CA (US)

(72) Inventors: Tianyang Bai, Somerville, NJ (US); Hua Wang, Basking Ridge, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 573 days.

(21) Appl. No.: 17/816,387

(22) Filed: Jul. 29, 2022

(65) Prior Publication Data

US 2024/0039606 A1    Feb. 1, 2024

(51) Int. Cl.
  *H04B 7/06*    (2006.01)
  *H04B 17/318*  (2015.01)
  *H04W 24/10*   (2009.01)

(52) U.S. Cl.
  CPC ......... *H04B 7/0695* (2013.01); *H04B 17/318* (2015.01); *H04W 24/10* (2013.01)

(58) Field of Classification Search
  CPC ................ H04B 7/0695; H04B 17/318; H04B 7/06952; H04B 7/088; H04B 7/0617; H04W 24/10; H04W 4/40; H04W 36/322
  See application file for complete search history.

(56) References Cited

U.S. PATENT DOCUMENTS

| | | | | |
|---|---|---|---|---|
| 2014/0146863 | A1* | 5/2014 | Seol ................... | H04B 7/0617 |
| | | | | 375/224 |
| 2019/0306675 | A1* | 10/2019 | Xue ...................... | H04W 4/40 |
| 2020/0366340 | A1* | 11/2020 | Zhang ................. | H04B 17/318 |
| 2022/0167243 | A1* | 5/2022 | Gundavelli ......... | H04W 36/322 |
| 2023/0412235 | A1* | 12/2023 | Thakur ................ | H04B 7/088 |
| 2025/0048432 | A1* | 2/2025 | Lee ...................... | H04B 17/328 |

FOREIGN PATENT DOCUMENTS

| | | |
|---|---|---|
| WO | 2022079269 A2 | 4/2022 |
| WO | 2022083864 A1 | 4/2022 |

OTHER PUBLICATIONS

International Search Report and Written Opinion—PCT/US2023/070280—ISA/EPO—Jan. 5, 2024.
Partial International Search Report—PCT/US2023/070280—ISA/EPO—Oct. 27, 2023.

\* cited by examiner

*Primary Examiner* — Vinncelas Louis
(74) *Attorney, Agent, or Firm* — ArentFox Schiff, LLP

(57) ABSTRACT

Aspect are direction to techniques for predicting future beams (e.g., transmit beams and/or receive beams) for communications between a network node and a user equipment (UE). In some examples, the UE may output, for transmission to a network node, beam information of a receive beam. The UE may obtain, via a beam pair comprising the receive beam and a transmit beam, signaling from the network node. In some examples, the UE may output, for transmission to the network node, a measurement of the signaling from a perspective of the receive beam.

18 Claims, 16 Drawing Sheets

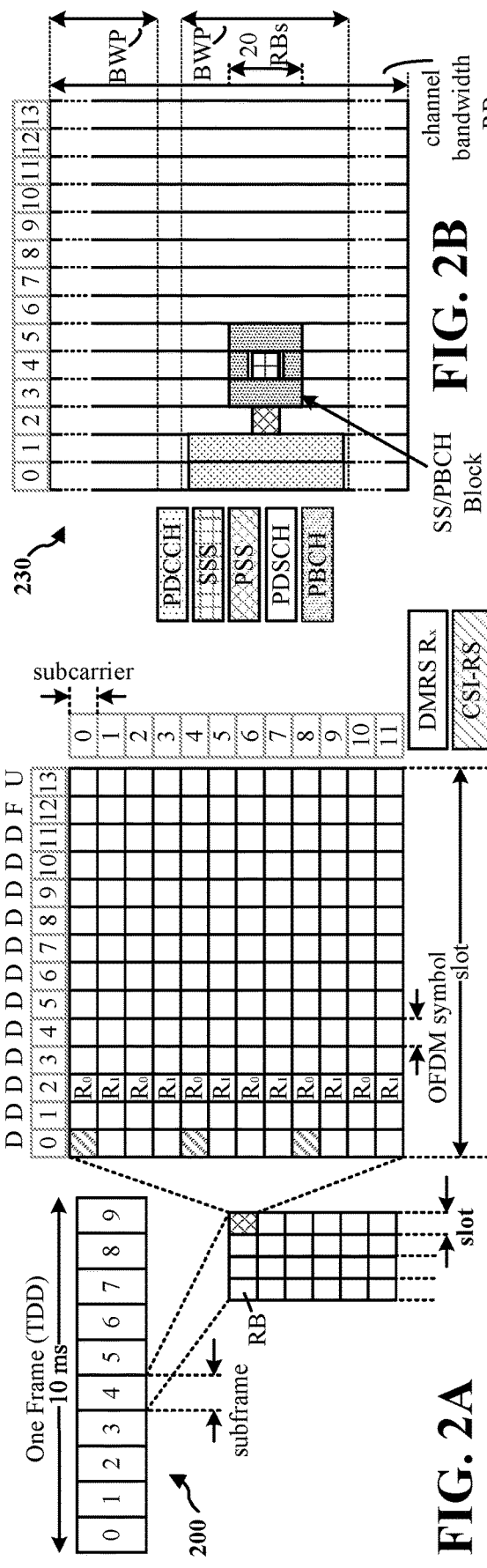
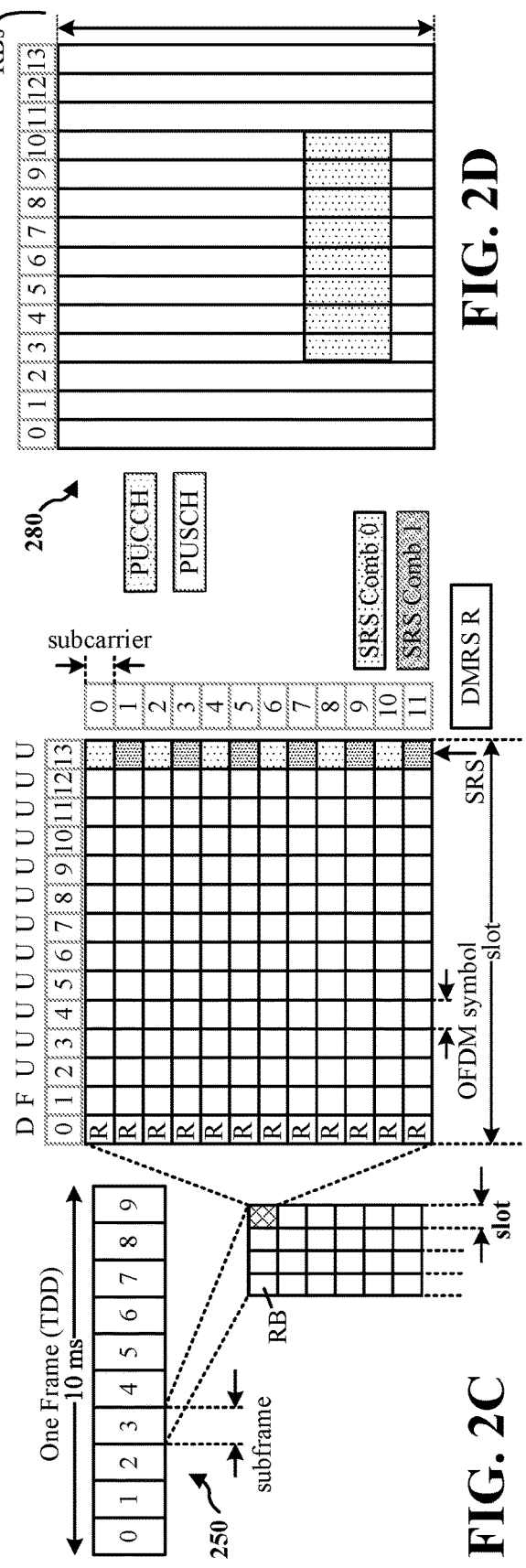
FIG. 2A  FIG. 2B  FIG. 2C  FIG. 2D

TRANSMIT-BEAM PREDICTION

BACKGROUND

Technical Field

The present disclosure generally relates to communication systems, and more particularly, to techniques and method for predicting a transmit beam for future communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Certain aspects are directed to an apparatus configured for wireless communication. The apparatus includes a memory comprising instructions, and one or more processors configured to execute the instructions. In some examples, the one or more processors are configured to output, for transmission to a network node, beam information of a receive beam. In some examples, the one or more processors are configured to obtain, via a beam pair comprising the receive beam and a transmit beam, signaling from the network node. In some examples, the one or more processors are configured to output, for transmission to the network node, a measurement of the signaling from a perspective of the receive beam.

Certain aspects are directed to a method for wireless communication at a user equipment (UE). In some examples, the method may include outputting, for transmission to a network node, beam information of a receive beam. In some examples, the method may include obtaining, via a beam pair comprising the receive beam and a transmit beam, signaling from the network node. In some examples, the method may include outputting, for transmission to the network node, a measurement of the signaling from a perspective of the receive beam.

Certain aspects are directed to a user equipment (UE). In some examples, the UE may include means for outputting, for transmission to a network node, beam information of a receive beam. In some examples, the UE may include means for obtaining, via a beam pair comprising the receive beam and a transmit beam, signaling from the network node. In some examples, the UE may include means for outputting, for transmission to the network node, a measurement of the signaling from a perspective of the receive beam.

Certain aspects are directed to a non-transitory computer-readable medium having instructions stored thereon that, when executed by a user equipment (UE), cause the UE to perform operations. In some examples, the operations include outputting, for transmission to a network node, beam information of a receive beam. In some examples, the operations include obtaining, via a beam pair comprising the receive beam and a transmit beam, signaling from the network node. In some examples, the operations include outputting, for transmission to the network node, a measurement of the signaling from a perspective of the receive beam.

Certain aspects are directed to an apparatus configured for wireless communication. The apparatus may include a memory comprising instructions, and one or more processors configured to execute the instructions. In some examples, the one or more processors are configured to obtain, via a receive beam and one or more transmit beams, signaling from a network node. In some examples, the one or more processors are configured to output, for transmission to the network node, an indication of a first transmit beam being predicted based on a measurement of the signaling from a perspective of the receive beam.

Certain aspects are directed to a method for wireless communication at a user equipment (UE). In some examples, the method may include obtaining, via a receive beam, signaling from a network node, wherein the signaling is obtained via one or more transmit beams. In some examples, the method may include outputting, for transmission to the network node, an indication of a first transmit beam being predicted based on a measurement of the signaling from a perspective of the receive beam.

Certain aspects are directed to a user equipment (UE). In some examples, the UE may include means for obtaining, via a receive beam, signaling from a network node, wherein the signaling is obtained via one or more transmit beams. In some examples, the UE may include means for outputting, for transmission to the network node, an indication of a first transmit beam being predicted based on a measurement of the signaling from a perspective of the receive beam.

Certain aspects are directed to a non-transitory computer-readable medium having instructions stored thereon that, when executed by a user equipment (UE), cause the UE to perform operations. In some examples, the operations include obtaining, via a receive beam, signaling from a network node, wherein the signaling is obtained via one or more transmit beams. In some examples, the operations include outputting, for transmission to the network node, an indication of a first transmit beam being predicted based on a measurement of the signaling from a perspective of the receive beam.

Certain aspects are directed to an apparatus configured for wireless communication. The apparatus may include a memory comprising instructions and one or more processors configured to execute the instructions. In some examples, the one or more processors are configured to obtain, from a user equipment (UE), beam information of a receive beam. In some examples, the one or more processors are configured to output signaling to the UE. In some examples, the one or more processors are configured to obtain, from the UE, a measurement of the signaling from a perspective of the receive beam.

Certain aspects are directed to a method for wireless communication at a network node. In some examples, the method may include obtaining, from a user equipment (UE), beam information of a receive beam. In some examples, the method may include outputting signaling to the UE. In some examples, the method may include obtaining, from the UE, a measurement of the signaling from a perspective of the receive beam.

Certain aspects are directed to at a network node. In some examples, the network node may include means for obtaining, from a user equipment (UE), beam information of a receive beam. In some examples, the network node may include means for outputting signaling to the UE. In some examples, the network node may include means for obtaining, from the UE, a measurement of the signaling from a perspective of the receive beam.

Certain aspects are directed to a non-transitory computer-readable medium having instructions stored thereon that, when executed by a network node, cause the network node to perform operations. In some examples, the operations include obtaining, from a user equipment (UE), beam information of a receive beam. In some examples, the operations include outputting signaling to the UE. In some examples, the operations include and obtaining, from the UE, a measurement of the signaling from a perspective of the receive beam.

Certain aspects are directed to an apparatus configured for wireless communication. The apparatus may include a memory comprising instructions, and one or more processors configured to execute the instructions. In some examples, the one or more processors are configured to output, for transmission to a user equipment (UE), signaling via one or more transmit beams. In some examples, the one or more processors are configured to obtain, from the UE, an indication of a first transmit beam predicted based on a measurement of the signaling.

Certain aspects are directed to a method for wireless communication by a network node. In some examples, the method includes outputting, for transmission to a user equipment (UE), signaling via one or more transmit beams. In some examples, the method includes obtaining, from the UE, an indication of a first transmit beam predicted based on a measurement of the signaling.

Certain aspects are directed to a network node. In some examples, the network node may include means for outputting, for transmission to a user equipment (UE), signaling via one or more transmit beams. In some examples, the network node may include means for obtaining, from the UE, an indication of a first transmit beam predicted based on a measurement of the signaling.

Certain aspects are directed to a non-transitory computer-readable medium having instructions stored thereon that, when executed by a network node, cause the network node to perform operations. In some examples, the operations include outputting, for transmission to a user equipment (UE), signaling via one or more transmit beams. In some examples, the operations include obtaining, from the UE, an indication of a first transmit beam predicted based on a measurement of the signaling.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
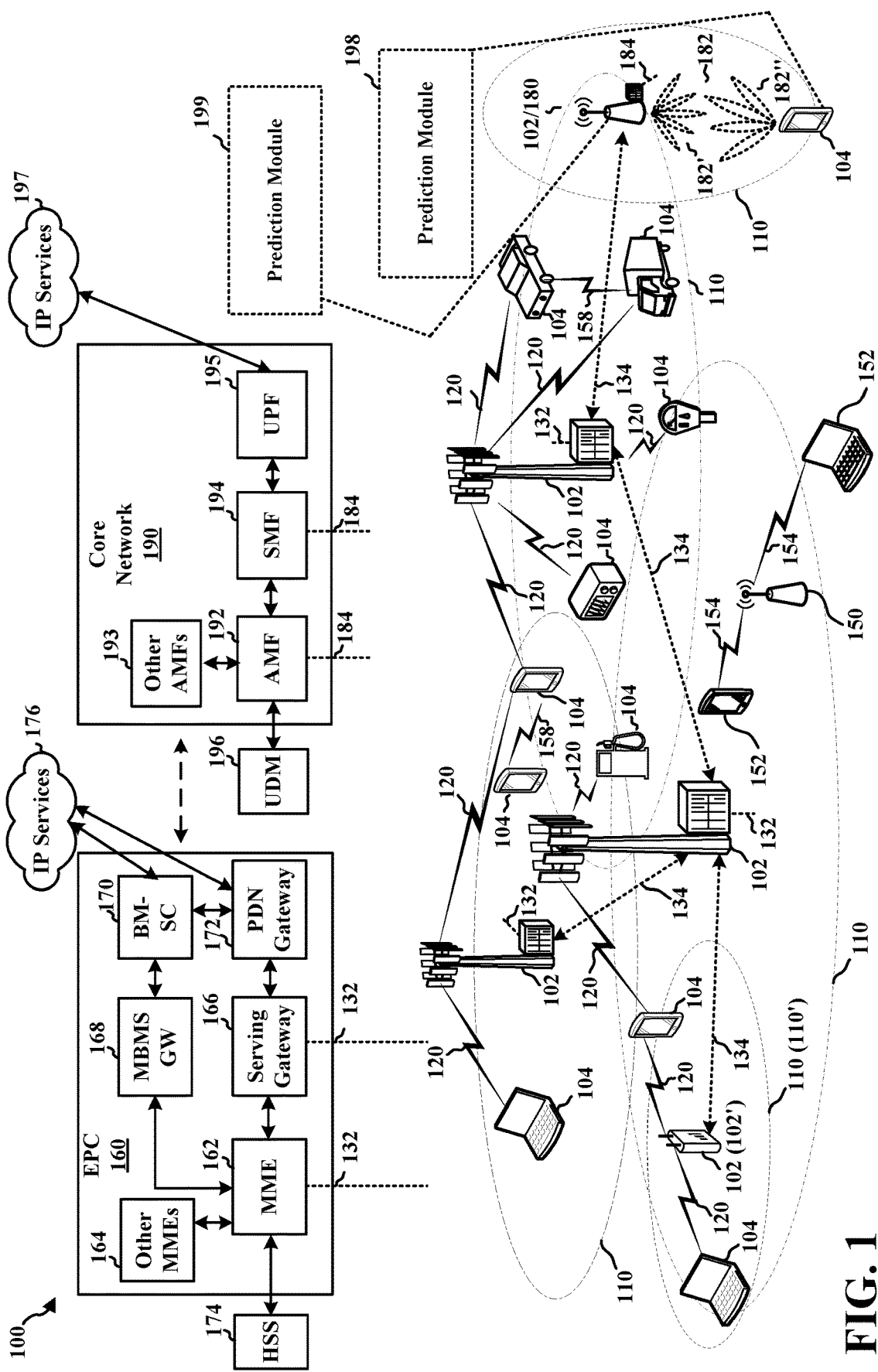
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In certain aspects, artificial intelligence (AI) or machine learning (ML) may be used to improve wireless communications. For example, AI/ML may be implemented to support beam management (e.g., beam prediction in time and/or spatial domain) for overhead and latency reduction, as well as improved estimation and/or prediction of beams for future communications.

In wireless communications (e.g., mmWave band), both the user equipment (UE) and the base station may perform directional beamforming. For example, the channel corresponding to each beamforming direction is sometimes called a beam (or beamformed channel). In some examples, the UE and base station may monitor channel quality (e.g. reference signal received power (RSRP), etc.) for different beams based on measuring reference signals (RSs) on different beams.

Certain aspects are directed to reducing overhead and latency associated with events like beam failure. In some examples, beam prediction via AI/ML algorithms may be used to predict channel quality of a first set of beams based on the past measurements of a second set of beams. In some examples, a predicted quality of the first set of beams may be a prediction of a future quality for a future time instance. Beam prediction may predict a future RSRP of a particular beam, or a beam identifier corresponding to a best quality beam. Such beam prediction may be based on RSRPs measured from synchronization signal blocks (SSBs) or RSs (e.g., CSI-RSs of a set of refined beams). It should be noted that the first set of beams may correspond to the same beams as the second set, include overlapping beams, or be completely separate sets of beams.

In certain aspects, beam prediction may be performed by the UE or the base station. For example, either of the UE or base station may include an AI/ML module configured for beam prediction (e.g., predict a future RSRP of a particular beam or a beam identifier corresponding to a best quality beam for future communication). An AI/ML beam prediction module run by the UE may receive information from a base station configuring the module for prediction. In this example, the base station may provide the UE with a trained neural network, or other information configuring the AI/ML module for beam prediction. In some examples, the base station may run the AI/ML beam prediction module based on UE feedback of channel measurements.

In some examples, the base station may run a prediction module based on UE reported RSRP measurements and UE-side beam information. Such measurements may improve the prediction module by reducing its size and improving its accuracy. For example, if the UE reported a measured RSRP for a particular base station transmit beam without including any information about the UE-side beam used to measure the transmit beam, then the prediction module would be very large because it would have to generalize information. Training the model would also be more time consuming because the training data would be generalized (e.g., RSRP data without information regarding a corresponding UE-side beam).

In certain aspects, the size of the prediction module and the training time may be reduced if the UE uses a particular receive (Rx) beam known by both the UE and the base station for measuring and reporting RSRP of a transmit beam. For example, the UE may use the same Rx beam for measuring all transmit beams of the base station, so that all reported RSRPs are measured from the same receive beam. Alternatively, the UE may report multiple measured RSRPs per transmit beam from the base station, measured using different Rx beams.

In certain aspects, along with the measured RSRPs, a UE may also report beam information about the Rx beam(s) used to measure RSRPs. For example, the UE may transmit its Rx beam patterns, Rx beam ID used for the reported measurements, as well as other information. Accordingly, the base station may use the measured RSRP and the reported Rx beam information as input for the prediction module.

In some examples, the UE may run the prediction module based on UE reported RSRP measurements and UE-side beam information. In such a case, the base station may configure the prediction module at the UE, but the UE may use the module to predict a best transmit beam for future communications.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Throughout the disclosure, a "network node" may be used to refer to a base station, or a disaggregated component of a base station. For example, a base station may be implemented as an aggregated base station (e.g., as described in reference to FIG. 4) or as a disaggregated base station (e.g., as described in reference to FIG. 5). Thus, in some examples, a network node may refer to one or more of a central unit (CU), a distributed unit (DU), a radio unit (RU), a near-real time (near-RT) radio access network (RAN) intelligent controller (RIC), and/or a non-real time (non-RT) RIC. In some examples, the network node may be an integrated access and backhaul (IAB) node, a relay node, etc.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured with a prediction module 198. In some examples, the prediction module 198 is configured to: output, for transmission to a network node, beam information of a receive beam; obtain, via a beam pair comprising the receive beam and a transmit beam, signaling from the network node; and output, for transmission to the network node, a measurement of the signaling from a perspective of the receive beam.

In certain aspects, the prediction module 198 may be configured to: obtain, via a receive beam and one or more transmit beams, signaling from a network node; and output, for transmission to the network node, an indication of a first transmit beam being predicted based on a measurement of the signaling from a perspective of the receive beam.

Referring again to FIG. 1, in certain aspects, the base station 180 may be configured with a prediction module 199. In some examples, the prediction module 199 may be configured to obtain, from a user equipment (UE), beam information of a receive beam; output signaling to the UE; and obtain, from the UE, a measurement of the signaling from a perspective of the receive beam.

In certain aspects, the prediction module 199 may be configured to output, for transmission to a user equipment (UE), signaling via one or more transmit beams; and obtain, from the UE, an indication of a first transmit beam predicted based on a measurement of the signaling.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kilohertz (kHz), where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
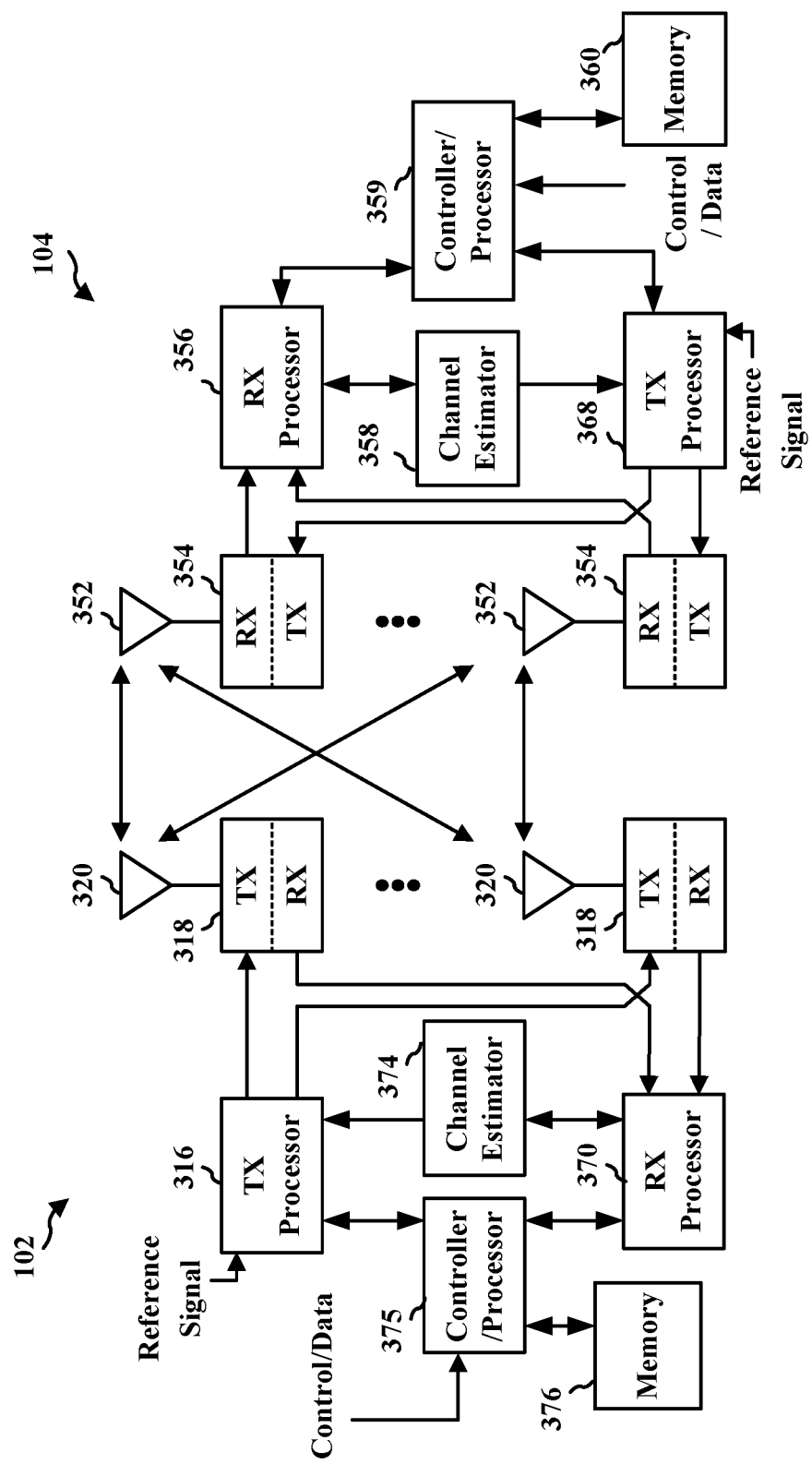
FIG. 3 is a diagram illustrating an example of a base station and user equipment (UE) in an access network.

FIG. 3 is a block diagram of a base station 102 in communication with a UE 104 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 104. Each spatial stream may then be provided to a different antenna 320 via a separate transmitter 318TX. Each transmitter 318TX may modulate an RF carrier with a respective spatial stream for transmission.

At the UE 104, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 104. If multiple spatial streams are destined for the UE 104, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 102. These soft decisions may be based on channel estimates computed by the channel estimator 358. The soft decisions are then decoded and deinterleaved to recover the data and control signals that were originally transmitted by the base station 102 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 102, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 102 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 102 in a manner similar to that described in connection with the receiver function at the UE 104. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 104. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the prediction module 198 of FIG. 1.

At least one of the TX processor 316, the RX processor 370, and the controller/processor 375 may be configured to perform aspects in connection with the prediction module 199 of FIG. 1.

Figure 4:
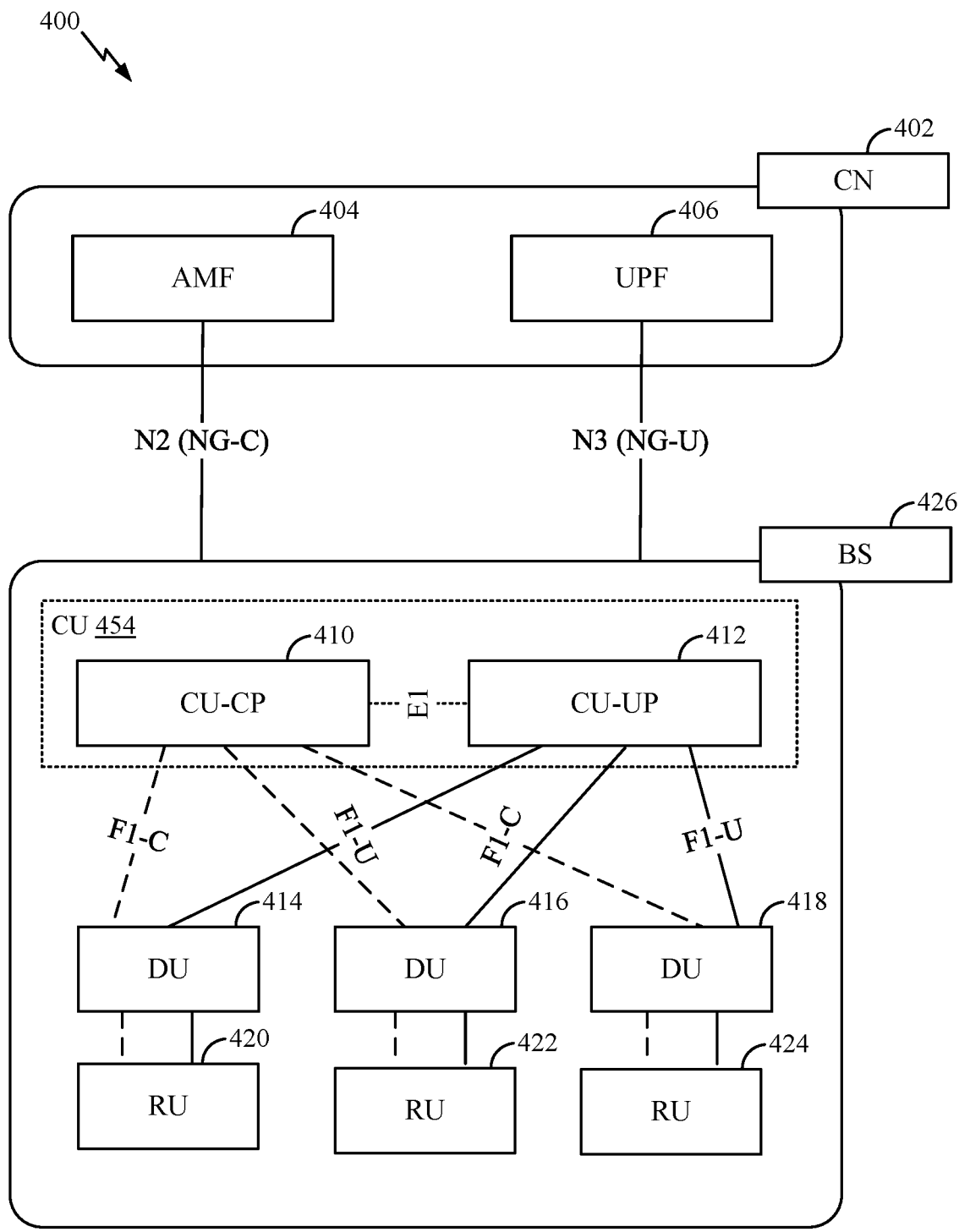
FIG. 4 illustrates an example monolithic (e.g., aggregated) architecture of a distributed radio access network.

FIG. 4 illustrates an example monolithic (e.g., aggregated) architecture of a distributed RAN 400, which may be implemented in the wireless communications system and an access network 100 illustrated in FIG. 1. As illustrated, the distributed RAN 400 includes core network (CN) 402 and a base station 426.

The CN 402 may host core network functions. CN 402 may be centrally deployed. CN 402 functionality may be offloaded (e.g., to advanced wireless services (AWS)), in an effort to handle peak capacity. The CN 402 may include an AMF 404 and a UPF 406. The AMF 404 and UPF 406 may perform one or more of the core network functions.

The base station 426 may communicate with the CN 402 (e.g., via a backhaul interface). The base station 426 may communicate with the AMF 404 via an N2 (e.g., NG-C) interface. The base station 426 may communicate with the UPF 406 via an N3 (e.g., NG-U) interface. The base station 426 may include a central unit-control plane (CU-CP) 410, one or more central unit-user planes (CU-UPs) 412, one or more distributed units (DUs) 414-418, and one or more radio units (RUs) 420-424.

The CU-CP 410 may be connected to one or more of the DUs 414-418. The CU-CP 410 and DUs 414-418 may be connected via a F1-C interface. As shown in FIG. 4, the CU-CP 410 may be connected to multiple DUs, but the DUs may be connected to only one CU-CP. Although FIG. 4 only illustrates one CU-UP 412, the base station 426 may include multiple CU-UPs. The CU-CP 410 selects the appropriate CU-UP(s) for requested services (e.g., for a UE). The CU-UP(s) 412 may be connected to the CU-CP 410. For example, the CU-UP(s) 412 and the CU-CP 410 may be connected via an E1 interface. The CU-UP(s) 412 may be connected to one or more of the DUs 414-418. The CU-UP(s) 412 and DUs 414-418 may be connected via a F1-U interface. As shown in FIG. 4, the CU-CP 410 may be connected to multiple CU-UPs, but the CU-UPs may be connected to only one CU-CP 410.

A DU, such as DUs 414, 416, and/or 418, may host one or more TRP(s) (transmit/receive points, which may include an edge node (EN), an edge unit (EU), a radio head (RH), a smart radio head (SRH), or the like). A DU may be located at edges of the network with radio frequency (RF) functionality. A DU may be connected to multiple CU-UPs that are connected to (e.g., under the control of) the same CU-CP (e.g., for RAN sharing, radio as a service (RaaS), and service specific deployments). DUs may be configured to individually (e.g., dynamic selection) or jointly (e.g., joint transmission) serve traffic to a UE. Each DU 414-416 may be connected with one of RUs 420/422/424.

The CU-CP 410 may be connected to multiple DU(s) that are connected to (e.g., under control of) the same CU-UP 412. Connectivity between a CU-UP 412 and a DU may be established by the CU-CP 410. For example, the connectivity between the CU-UP 412 and a DU may be established using bearer context management functions. Data forwarding between CU-UP(s) 412 may be via a Xn-U interface.

The distributed RAN 400 may support fronthauling solutions across different deployment types. For example, the RAN 400 architecture may be based on transmit network capabilities (e.g., bandwidth, latency, and/or jitter). The distributed RAN 400 may share features and/or components with LTE. For example, the base station 426 may support dual connectivity with NR and may share a common fronthaul for LTE and NR. The distributed RAN 400 may enable cooperation between and among DUs 414-418, for example, via the CU-CP 412. An inter-DU interface may not be used. Logical functions may be dynamically distributed in the distributed RAN 400.

Figure 5:
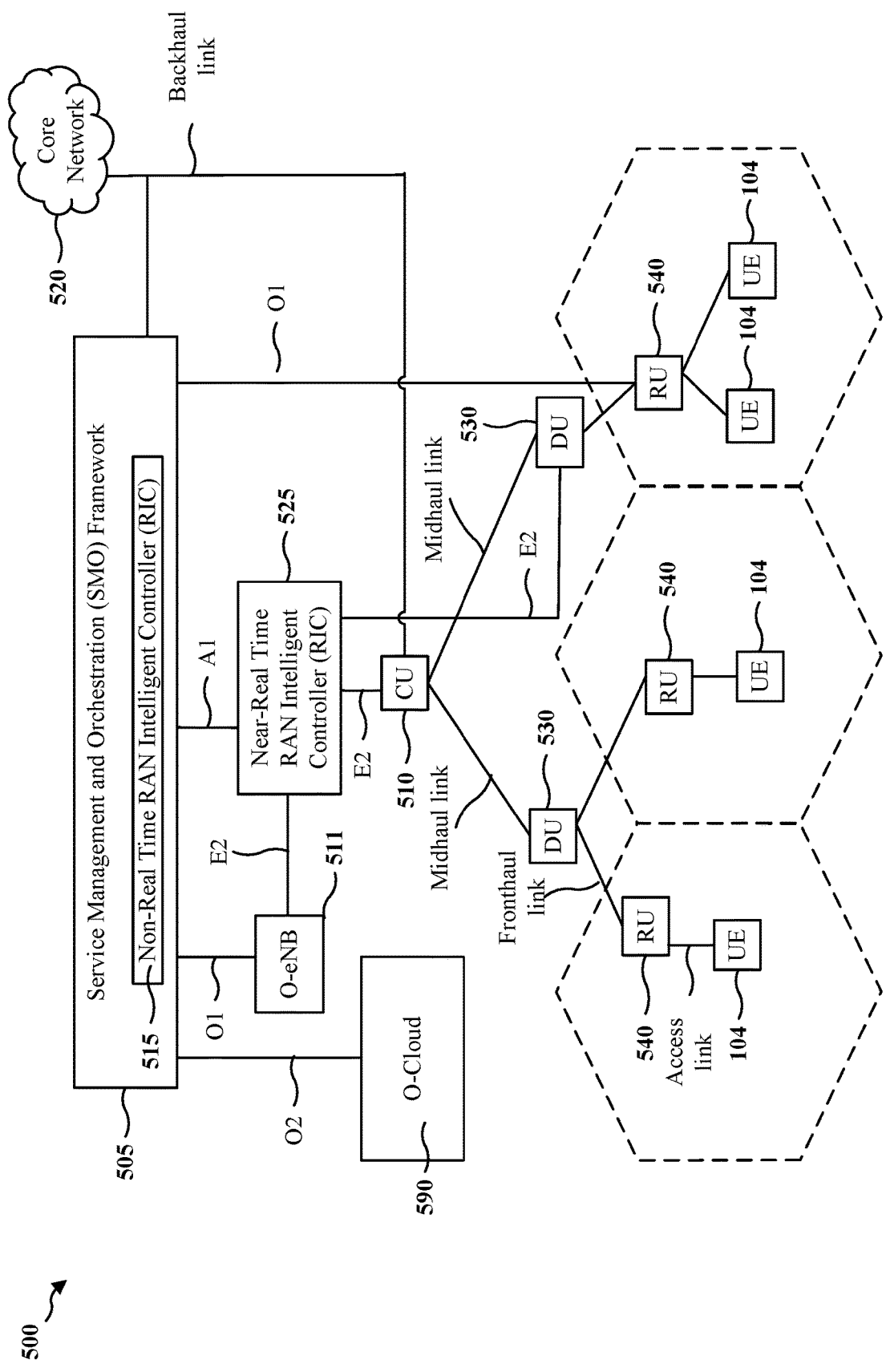
FIG. 5 is a block diagram illustrating an example disaggregated base station architecture.

FIG. 5 is a block diagram illustrating an example disaggregated base station 500 architecture. The disaggregated base station 500 architecture may include one or more CUs 510 that can communicate directly with a core network 520 via a backhaul link, or indirectly with the core network 520 through one or more disaggregated base station units (such as a near real-time (RT) RIC 525 via an E2 link, or a non-RT RIC 515 associated with a service management and orchestration (SMO) Framework 505, or both). A CU 510 may communicate with one or more DUs 530 via respective midhaul links, such as an F1 interface. The DUs 530 may communicate with one or more RUs 540 via respective fronthaul links. The RUs 540 may communicate with respective UEs 104 via one or more radio frequency (RF) access links. In some implementations, the UE 104 may be simultaneously served by multiple RUs 540.

Each of the units, i.e., the CUs 510, the DUs 530, the RUs 540, as well as the near-RT RICs 525, the non-RT RICs 515 and the SMO framework 505, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 510 may host higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 510. The CU 510 may be configured to handle user plane functionality (i.e., central unit—user plane (CU-UP)), control plane functionality (i.e., central unit—control plane (CU-CP)), or a combination thereof. In some implementations, the CU 510 can be logically split into one or more CU-UP units and one or more CU-CP units. The CU-UP unit can communicate bidirectionally with the CU-CP unit via an interface, such as the E1 interface when implemented in an O-RAN configuration. The CU 510 can be implemented to communicate with the DU 530, as necessary, for network control and signaling.

The DU 530 may correspond to a logical unit that includes one or more base station functions to control the operation of one or more RUs 540. In some aspects, the DU 530 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 530 may further host one or more low PHY layers. Each layer (or module) can be implemented with an interface configured to communicate signals with other layers (and modules) hosted by the DU 530, or with the control functions hosted by the CU 510.

Lower-layer functionality can be implemented by one or more RUs 540. In some deployments, an RU 540, controlled by a DU 530, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 540 can be implemented to handle over the air (OTA) communication with one or more UEs 104. In some implementations, real-time and non-real-time aspects of control and user plane communication with the RU(s) 540 can be controlled by the corresponding DU 530. In some scenarios, this configuration can enable the DU(s) 530 and the CU 510 to be implemented in a cloud-based RAN architecture, such as a virtual RAN (vRAN) architecture.

The SMO Framework 505 may be configured to support RAN deployment and provisioning of non-virtualized and virtualized network elements. For non-virtualized network elements, the SMO framework 505 may be configured to support the deployment of dedicated physical resources for RAN coverage requirements, which may be managed via an operations and maintenance interface (such as an O1 interface). For virtualized network elements, the SMO framework 505 may be configured to interact with a cloud computing platform (such as an open cloud (O-cloud) 590) to perform network element life cycle management (such as to instantiate virtualized network elements) via a cloud computing platform interface (such as an O2 interface). Such virtualized network elements can include, but are not limited to, CUs 510, DUs 530, RUs 540 and near-RT RICs 525. In some implementations, the SMO framework 505 can communicate with a hardware aspect of a 4G RAN, such as an open eNB (O-eNB) 511, via an O1 interface. Additionally, in some implementations, the SMO Framework 505 can communicate directly with one or more RUs 540 via an O1 interface. The SMO framework 505 also may include the non-RT RIC 515 configured to support functionality of the SMO Framework 505.

The non-RT RIC 515 may be configured to include a logical function that enables non-real-time control and optimization of RAN elements and resources, artificial intelligence/machine learning (AI/ML) workflows including model training and updates, or policy-based guidance of applications/features in the near-RT RIC 525. The non-RT RIC 515 may be coupled to or communicate with (such as via an A1 interface) the near-RT RIC 525. The near-RT RIC 525 may be configured to include a logical function that enables near-real-time control and optimization of RAN elements and resources via data collection and actions over an interface (such as via an E2 interface) connecting one or more CUs 510, one or more DUs 530, or both, as well as an O-eNB, with the near-RT RIC 525.

In some implementations, to generate AI/ML models to be deployed in the near-RT RIC 525, the non-RT RIC 515 may receive parameters or external enrichment information from external servers. Such information may be utilized by the near-RT RIC 525 and may be received at the SMO Framework 505 or the non-RT RIC 515 from non-network data sources or from network functions. In some examples, the non-RT RIC 515 or the near-RT RIC 525 may be configured to tune RAN behavior or performance. For example, the non-RT RIC 515 may monitor long-term trends and patterns for performance and employ AI/ML models to perform corrective actions through the SMO Framework 505 (such as reconfiguration via O1) or via creation of RAN management policies (such as A1 policies).

Aspects of the disclosure are directed to beam prediction at one or more of a UE or a network node. The beam prediction may be performed by an AI/ML module trained using information provided by the UE. The beam prediction module may predict a beam pair channel (e.g., a UE beam and a network node beam), or at least a transmit beam, for future communications between the UE and the network node.

In general, RSRPs of the same transmit (Tx) beam (e.g., network node-side transmit beam) measured by different receive (Rx) beams (e.g., UE-side receive beams) will be different because of different directivity gain towards the angle of the incoming Tx beam. Thus, in order to determine a best (e.g., highest quality signal) Rx beam, the UE may use different Rx beams to measure the same Tx beam. For example, the UE and network node may perform a P3 sweep of UE Rx beams defined by a channel state information reference signal (CSI-RS) set with repetition of the same Tx beam.

It should be noted, however, that different models of UE (e.g., different manufacturing models, operating system models, etc.) may have different codebook designs, resulting in different model UEs using a different number of Rx beams, and array gain and coverage of each beam. In some examples, the same UE may use different codebook and antenna panel configurations depending on which mode (e.g., power saving mode, etc.) the UE is operating in. This may result in different levels of codebooks being used by the same UE and narrower/wider Rx beams having different RSRP measurements. Moreover, differently size arrays between different UEs may result in different directivity gains and different RSRP measurements of the same Tx beam.

It should be noted that UE implementation of Rx beams may be transparent to network node. For example, when the network node is running an AI/ML module for predicting a future Tx beam for communication, the network node may not be aware of the Rx beam(s) from which the reported RSRPs are measured. As such, when RSRPs associated with the same network node Tx beam changes, the network node may not know if the change is due to using different Rx beams, UE movement, or another reason. Even in a case where the UE is configured to run the AI/ML module, the module may be configured and trained by NW. Thus, during a training stage of the module, if network node has no UE-side beam information associated with the training data, the AI/ML module cannot be trained to incorporate UE beam information.

In some examples, RSRPs of the same Tx beam may be measured by different Rx beams. However, if the RSRP measurements are not "calibrated," an error level of AI/ML module may be significant. For example, different values of RSRPs due to different Rx beams may confuse or complicate AI/ML module in training if the same UE location corresponds to the different values of RSRPs. Such a scenario may also require a much larger neural network of the AI/ML module to make the module more general and reduce the error.

Moreover, training a general neural network of an AI/ML module for all UE models/modes may further increase the size of the AI/ML, considering different UE models have different Rx beam configurations. Thus, in certain aspects, given all UE of different models are sharing the same environment, a common format of information used to train the AI/ML module may reduce the complexities associated with diverse modes and models of UE.

Changes may be made in the function and arrangement of elements and examples discussed herewith without departing from the disclosure. For example, various examples may omit, substitute, or add various procedures or components described in other examples as appropriate. For instance, the methods and communications described may be performed in an order different from that described, and various steps may be added, omitted, or combined. Also, features described with respect to some examples may be combined in some other examples. For example, an apparatus may be implemented or a method may be practiced using any number of the aspects set forth herein.

Examples of Prediction Modules Operated by the Network Node

Figure 6:
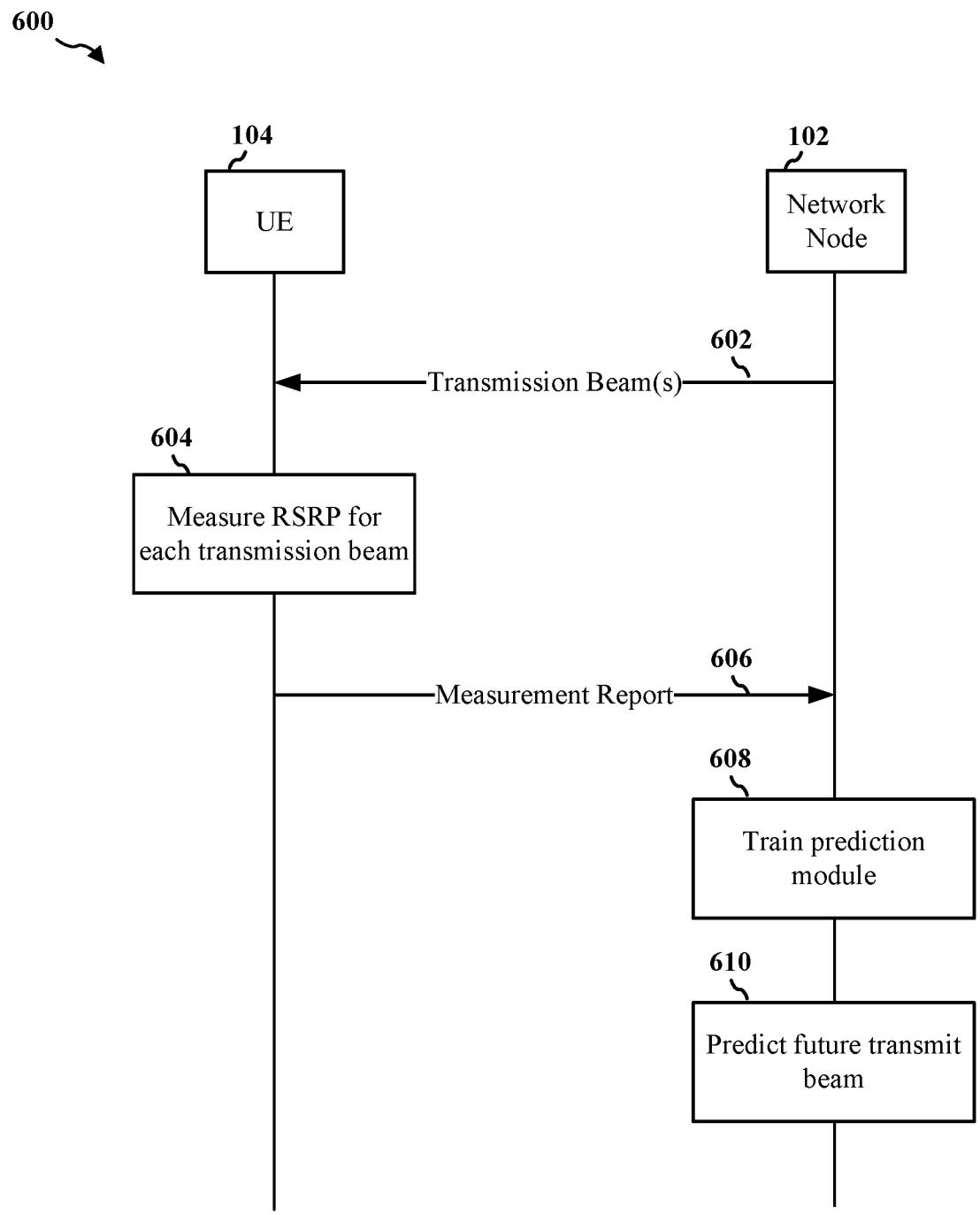
FIG. 6 is a call-flow diagram illustrating example communications between a UE and a network node.

FIG. 6 is a call-flow diagram illustrating example communications 600 between a UE (e.g., UE 104 of FIGS. 1 and 3) and a network node (e.g., base station 102 of FIGS. 1 and 3, base station 426 of FIG. 4, base station 500 of FIG. 5).

At a first communication 602, the network node 102 may transmit signaling (e.g., RSs or SSBs) via a first Tx beam. In some examples, the network node 102 may transmit signaling over multiple Tx beams (e.g., consecutively or simultaneously).

At a first process 604, the UE 104 may receive the transmitted signaling via an Rx beam, and measure the RSRP of the transmitted signaling. In some examples, the UE may receive multiple signals transmitted via multiple Tx beams using the same Rx beam. In such an example, the UE may measure each of the transmitted signals from the perspective of the same Rx beam. That is, the UE may measure an RSRP for each signal transmitted via multiple Tx beams, wherein the RSRP of each signal is the RSRP as received by the UE via the same Rx beam.

In some examples, the network node may configure the UE 104 with an indication of the Rx beam to be used for RSRP measurement. For example, the network node 102 may transmit an Rx beam identifier to the UE 104 prior to the first communication 602 so that the UE 104 knows the Rx beam to use for RSRP measurement.

In some examples, the UE may use multiple Rx beams for RSRP measurement. That is, the UE 104 may receive, via multiple Rx beams, signaling transmitted over the same Tx beam. In such an example, the UE may calibrate one or more of the Rx beams so that the beam is relatively wider or narrower prior to measuring the RSRP. In one example, the UE 104 may calibrate an Rx beam by adjusting the directivity gain of the Rx beam to make it narrower prior to measuring the RSRP. In another example, the UE 104 may not adjust the Rx beam, but rather calibrate the RSRP measurement by adjusting the RSRP measurement to reflect a measurement taken by a narrower beam. In yet another example, the UE 104 may be configured with a first Rx beam for measuring RSRP of transmitted signals. Thus, the network node 102 may expect that any RSRP feedback is based on measurements of signals received over the first Rx beam. Because of this, the UE 104 may calibrate any RSRP measured by a second Rx beam in order to make the measured RSRP consistent with an RSRP measured using the first Rx beam. In some examples, the UE 104 may determine which Rx beam(s) to use without guidance from the network node 102. In such an example, the UE 104 may provide the network node 102 with an indication of the Rx beam(s) used to measure RSRP prior to the measurement or along with a measurement report.

In some examples, the UE 104 may determine and report any error associated with the calibration of an RSRP measurement or conversion of an RSRP measurement to a common format. For example, the error level may depend on how may Rx beams the UE 104 used to measure the RSRP of a Tx beam. Accordingly, the error level may be transmitted to the network node 102 in a second communication 606.

At a second communication 606, the UE 104 may transmit a measurement report to the network node 102. The measurement report may include one or more RSRPs measured based on a signal transmitted via a Tx beam in the first communication 602. The measurement report may not include Rx beam information if the network node 102 has already configured the UE 104 with an Rx beam to use for RSRP measurement. In such an example, the network node 102 may assume that the configured Rx beam on the UE-side was used to measure the RSRP(s) provided in the measurement report. In some examples, the measurement report may include multiple RSRPs measured from multiple different Rx beams for a single Tx beam.

In some examples, the measurement information may include beam information identifying the Rx beam used by the UE 104 to measure the RSRP. The beam information may include one or more of a beam pattern of the Rx beam, an identifier of the Rx beam, an orientation of the UE 104, a velocity/speed of the UE 104, and/or a change in velocity/speed of the UE 104. In some examples, the beam pattern comprises a directivity gain of an Rx beam across one or more of an azimuth angle of arrival (AOA) and a zenith angle of arrival (ZOA). For example, the beam pattern may be reported as directivity gains across AOA and/or ZOA angles. It should be noted that the beam information may also, or alternatively, be transmitted to the network node 102 prior to the first communication 602.

The UE 104 may also transmit updates to the beam information to the network node 102 periodically, semi persistently, or in response to events that alter the beam information.

At a second process 608, the network node 102 may receive the measurement report and train an AI/ML module using the information of the measurement report as input(s) to the module. In some cases, the network node 102 may input a measured RSRP and a corresponding Rx beam and/or Rx beam information included in the report. For example, the network node 102 may use a reported beam pattern to calibrate a reported RSRP, and then use the calibrated RSRP for AI/ML module training.

At a third process 610, the network node 102 may use the AI/ML module to predict a Tx beam to use for transmitting signaling to the UE 104 at a future time. For example, the network node 102 may predict a best (e.g., highest predicted quality, best SINR, etc.) Tx beam ID from multiple Tx beams.

In certain aspects, the AI/ML module may be split into multiple parts, wherein one part is managed by the UE 104, and another part is managed by the network node 102. That is, the AI/ML module may be shared by the UE 104 and the network node 102. In this example, the AI/ML module may be configured to use a particular format for RSRP measurements.

In one example, the AI/ML module of the UE 104 may be configured to determine which one or more Rx beams to use for receiving Tx beam signaling. The AI/ML module of the UE 104 may also convert the measured RSRP into a common format used by the AI/ML module of both the UE 104 and the network node 102. In some examples, the format may be a format corresponding to a measurement of a signal received using a particular type of antenna (e.g., omnidirectional antenna). That is, the UE 104 may use the AI/ML module to convert an RSRP measurement of the received signal to an omni-reception RSRP. In this manner, the model and type of antenna used by the UE 104 is transparent to the network node 102. That is, the model of the UE 104 would not affect the training of the AI/ML module at the network node 102, making the network node 102 training of the AI/ML module universal for all UE models. Once the RSRP is converted to the omni-reception RSRP format (e.g., an RSRP expected of a 0 bBi omni-directional antenna), the UE 104 may transmit the converted RSRP to the network node (e.g., in the second communication 606 of FIG. 6).

In some examples, the common RSRP measurement format is a heatmap indicative of power of one or more network node 102 beams across one or more of AOA and/or AOZ angles. In such an example, the UE 104 may convert RSRPs measured from one or more Rx beams into a heatmap. In some examples, the UE 104 may be configured by the network node 102 to use a common heatmap format. In one example, the heatmap is based on the same reference orientation (e.g., 0 degree Azimuth is north). Thus, the UE 104 may transmit the heatmap to the network node 102 in the second communication 606 of FIG. 6. In some examples, the UE 104 may also provide orientation information of the UE 104 in the second communication 606.

In the examples above, the UE 104 may convert the measured RSRP of signals transmitted by the network node 102 to a common format so that the network node 102 can train the AI/ML module for predicting future Tx beams universally for all UEs regardless of the model.

Figure 7:
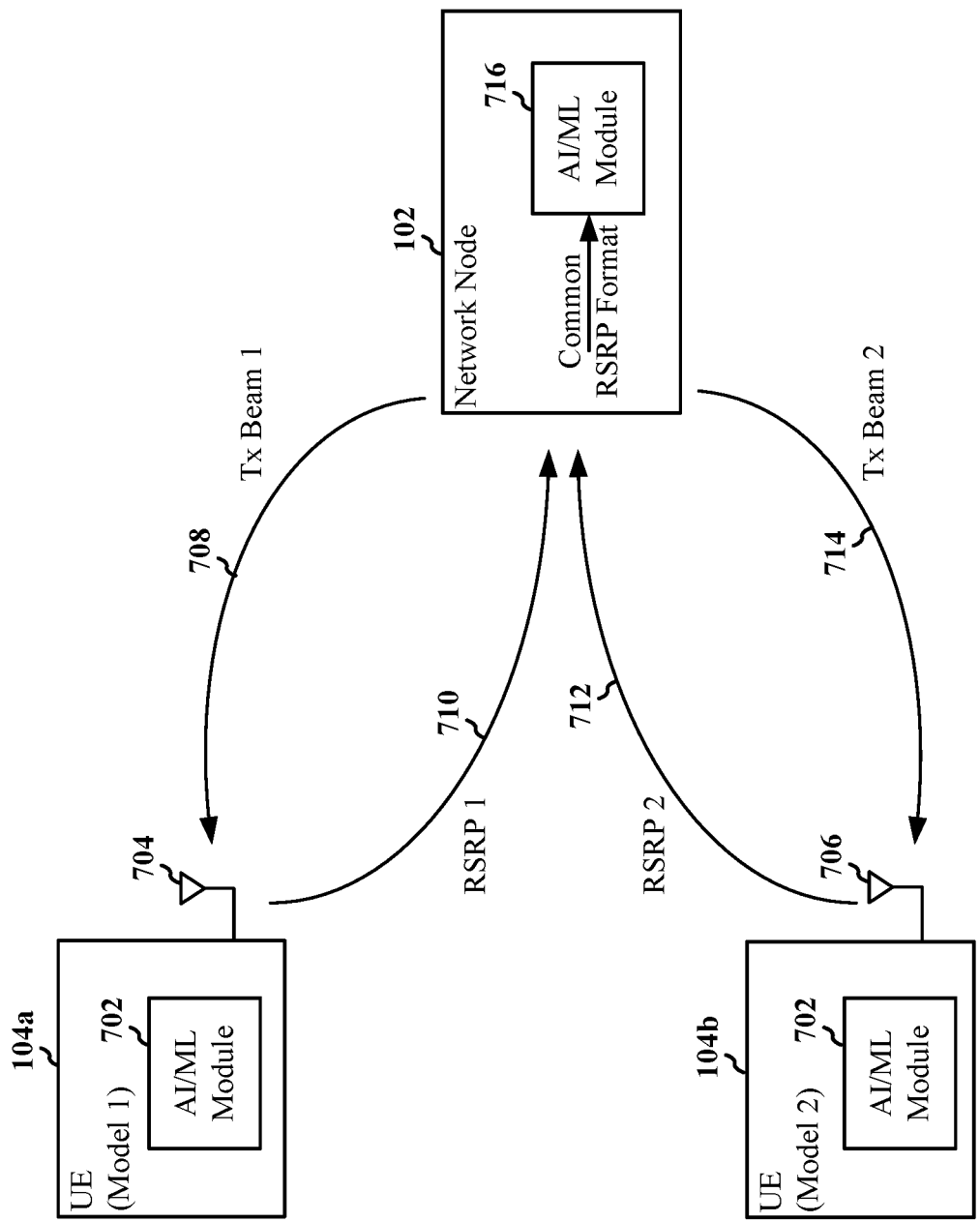
FIG. 7 is a diagram illustrating example communications between a network node and a first UE and a second UE.

FIG. 7 is a diagram illustrating example communications between a network node 102 and a first UE 104a and a second UE 104b. The first UE 104a is a first model UE and includes a first antenna 704 and an AI/ML module 702, while the second UE 104b is a second model UE and includes a second antenna 706 and an AI/ML module 702. Accordingly, the first UE 104a and the second UE 104b may be different models and include different antenna configurations. The network node 102 includes an AI/ML module 716.

Initially, the network node 102 may transmit signaling to the first UE 104a via a first Tx beam 708 and transmit signaling to the second UE 104b via a second Tx beam 714. The first UE 104a and the second UE 104b may receive the respective signaling via one or more Rx beams and measure the received signaling to determine an RSRP for the received signals. At each UE, the AI/ML module 702 may convert the measured RSRP to a common format (e.g., omni-reception format). The first UE 104a may transmit the first common RSRP 710 format to the network node 102, and the second UE 104b may transmit the second common RSRP 712 format to the network node 102. Thus, the network node 102 receives a common RSRP measurement format from each of the UEs, making the network node 102 and the AI/ML module 716 on the network node-side agnostic to unique configurations of the UEs.

The network node 102 may use the received universal RSRP formats to train the AI/ML module 716 for predicting future Tx beams and/or future RSRPs associated with Tx beams.

In some examples, the common format may be defined by a wireless communication standard, an agreement between a service provider and a client, or may be defined by the network node 102. The service agreement may also define a minimum accuracy of the conversion of the RSRP measurement to the common format that the UE must adhere to.

Examples of Prediction Modules Operated by the Network Node

Figure 8:
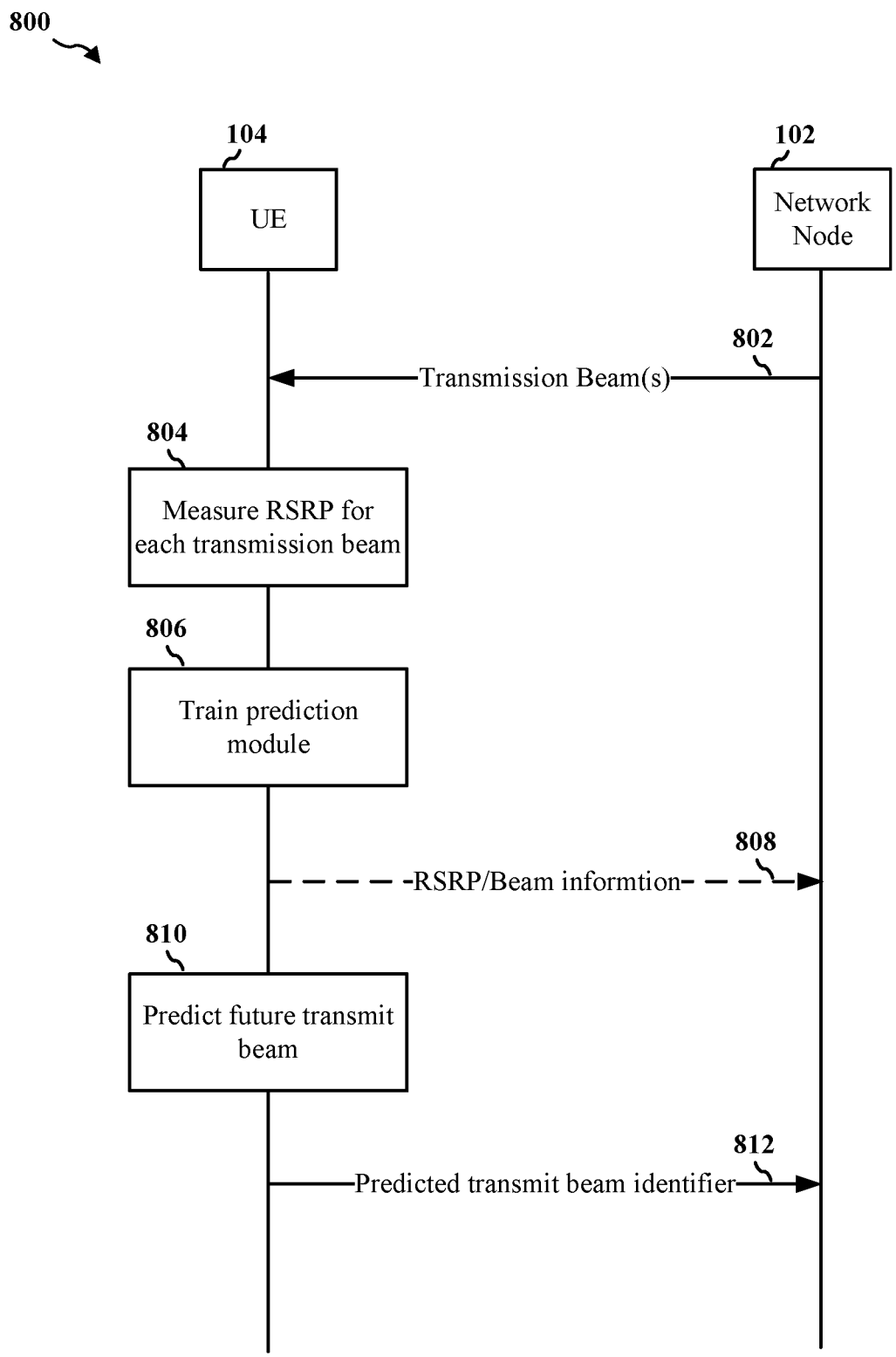
FIG. 8 is a call-flow diagram illustrating example communications between a UE and a network node.

FIG. 8 is a call-flow diagram illustrating example communications 800 between a UE 104 and a network node 102. In this example, the UE 104 may use a UE-side AI/ML module to predict a Tx beam for future communications with the network node 102 and transmit an indication of the predicted Tx beam to the network node 102. As such, the UE 104 may not provide the network node 102 with an indication of the RSRP of signaling received over a Tx beam measured by the UE 104.

Initially, the network node 102 may transmit a signal to the UE 104 via one or more Tx beams in a first communication 802. At a first process 804, the UE 104 may measure an RSRP for each Tx beam, using one or more Rx beams to receive the signaling from each Tx beam. In some examples, the network node 102 may configure the UE 104 to use a particular one or more Rx beams for receiving and measuring the transmitted signaling. In other examples, the UE 104 may determine which one or more Rx beams to use.

In some examples, the UE may use multiple Rx beams for RSRP measurement. That is, the UE 104 may receive, via multiple Rx beams, signaling transmitted over the same Tx beam. In such an example, the UE may calibrate one or more of the Rx beams so that the beam is relatively wider or narrower prior to measuring the RSRP. In one example, the UE 104 may calibrate an Rx beam by adjusting the directivity gain of the Rx beam to make it narrower prior to measuring the RSRP. In another example, the UE 104 may not adjust the Rx beam, but rather calibrate the RSRP measurement by adjusting the RSRP measurement to reflect a measurement taken by a narrower beam. In yet another example, the UE 104 may calibrate any RSRP measured by a second Rx beam in order to make the measured RSRP consistent with an RSRP measured using a first Rx beam. As such, each UE may be configured to commonly calibrate RSRP measurements so that each UE is training its respective AI/ML module with a common RSRP format.

At a second process 806, the UE 104 may train the AI/ML module operated by the UE 104. For example, the UE may use a measured RSRP or a commonly calibrated RSRP measurement as an input to the AI/ML module. In some examples, the UE 104 may also use beam information as an input to the AI/ML module. Specifically, the UE 104 may input the measured RSRP along with one or more of a beam pattern of the Rx beam used to receive the measured signaling, an identifier of the Rx beam, an orientation of the UE 104, a speed/velocity change of the UE 104, and/or other information about the mobility of the UE 104. The information may train the module so that the UE 104 can predict a Tx beam that would provide the relatively highest quality communication between the UE 104 and network node 102.

In a second communication 808, the UE 104 may optionally transmit an indication of a measured RSRP and/or beam information to the network node 102. In this example, the network node 102 may input the information provided by the UE 104 into its own AI/ML module to further train the module used by the network node 102. In some examples, the UE may train its own AI/ML module with RSRP and other beam information, but transmit calibrated RSRP (e.g., a common format of RSRP) and beam information to the network node 102. In this manner, the UE 104 may use its own AI/ML module to improve communication, while also improving a universal AI/ML module used by the network node 102.

In some examples, the UE 104 may determine and report any error associated with the calibration of an RSRP measurement or conversion of an RSRP measurement to a common format. For example, the error level may depend on how may Rx beams the UE 104 used to measure the RSRP of a Tx beam. Accordingly, the error level may be transmitted to the network node 102 in the second communication 808. The network node 102 may configure a UE with a neural network of the AI/ML module used by the network node 102.

At a third process 810, the UE 104 may predict, based on its own AI/ML module, a Tx beam for future communication with the network node 102. For example, the AI/ML module may be used to predict which Tx beam will provide the highest quality (e.g., SINR) communication between the UE 104 and network node 102. The prediction may be based on the RSRP and other beam information used to train the AI/ML module.

At a third communication 812, the UE 104 may transmit an indication of the predicted Tx beam to the network node 102. For example, the UE 104 may transmit an indication of a beam ID of the predicted Tx beam, and/or a predicted RSRP of the predicted Tx beam.

Figure 9:
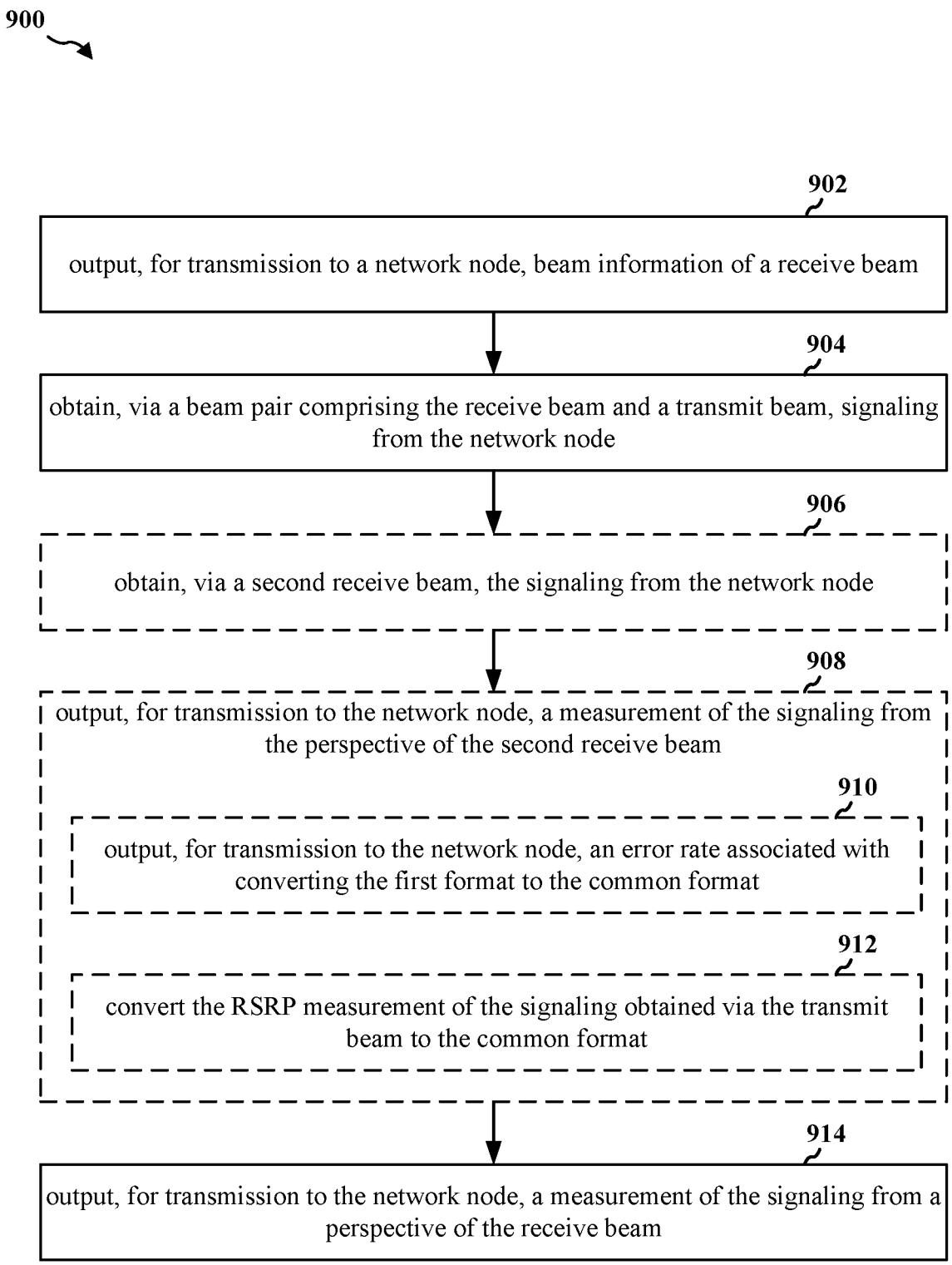
FIG. 9 is a flowchart of a method of wireless communication.

FIG. 9 is a flowchart 900 of a method of wireless communication. The method may be performed by a UE (e.g., the UE 104; the apparatus 1002). At 902, the UE may output, for transmission to a network node, beam information of a receive beam. For example, 902 may be performed by a transmitting component 1040 of FIG. 10. Here, the beam information may include one or more of a beam pattern of the receive beam, an identifier of the receive beam, an orientation of the UE, and a velocity change of the UE. In some examples, the beam pattern comprises a directivity gain of the receive beam across one or more of an azimuth angle of arrival (AOA) and a zenith angle of arrival (ZOA). For example, 902 may correspond to the second communication 606 of FIG. 6 or the second communication 808 of FIG. 8.

At 904, the UE may obtain, via a beam pair comprising the receive beam and a transmit beam, signaling from the network node. For example, 904 may be performed by a receiving component 1042 of FIG. 10. Here, the signaling may include any suitable reference signal (e.g., CSI-RS or other reference signal) or SSB signal. The UE may receive the signaling via the receive beam and measure the signaling from the perspective of the receive beam (e.g., measure an RSRP of the signaling as it is received by the receive beam). In some examples, the measurement of the signaling is defined by a common format based on an RSRP measurement of the signaling obtained via the transmit beam. For example, the common format may be a heatmap having a common reference orientation (e.g., 0 degree in Azimuth is north), wherein the reference orientation is common among the UE and the network node. In some examples, the common format is an omni-antenna RSRP measurement format. That is, the UE may measure the RSRP of the signaling, then convert the measured RSRP to a modified RSRP that reflects what the received RSRP would be if the UE antenna receiving the signaling was an omni-antenna. For example, 904 may correspond to receiving the first communication 602 of FIG. 6 or receiving the first communication 802 of FIG. 8.

At 906, the UE may optionally obtain, via a second receive beam, the signaling from the network node. For example, 906 may be performed by the receiving component 1042 of FIG. 10. Here, the UE may receive the same signaling transmitted from the network node via multiple receive beams. In this way, the UE may measure the same signaling across multiple receive beams to help determine a best receive beam for receiving the singling and establishing a beam pair with the transmit beam over which the signaling was transmitted. In some examples, 906 may correspond to the first communication 602 of FIG. 6 or the first communication 802 of FIG. 8.

At 908, the UE may optionally output, for transmission to the network node, a measurement of the signaling from the perspective of the second receive beam. For example, 908 may be performed by the receiving component 1042 of FIG. 10. Here, the UE may transmit multiple measurements of the same signal taken from multiple receive beams. The multiple measurements may be transmitted in the same message. In some examples, the beam information of 902 may be is output in a same transmission as the multiple measurements of the signaling. In some examples, 908 may correspond to the second communication 606 of FIG. 6 or the second communication 808 of FIG. 8.

At 910, the UE may optionally output, for transmission to the network node, an error rate associated with converting the first format to the common format. For example, 910 may be performed by a transmitting component 1040 of FIG. 10. Here, the UE may provide the network node with an indication of an error associated with converting the RSRP measurement to a modified RSRP measurement configured to be indicative of an RSRP of a signal received by another antenna (e.g., an omni-antenna). In some examples, 910 may correspond to the second communication 606 of FIG. 6 or the second communication 808 of FIG. 8.

At 912, the UE may optionally convert the RSRP measurement of the signaling obtained via the transmit beam to the common format. For example, 912 may be performed by a converting component 1044 of FIG. 10. Here, the UE may receive signaling from the network node via an antenna of the UE. That is, the UEs antenna receives the signaling. The UE may measure the RSRP as it is received from the antenna. The antenna may be a first type of antenna. The UE may then convert the RSRP from an RSRP that was measured based on a signal received from the first type of antenna to an RSRP that was measured based on a signal received from a second type of antenna (e.g., an omni antenna). In another example, the UE may receive the signaling from the network node and measure the signaling to determine the RSRP of the signaling. Initially, the RSRP measurement may be a first format (e.g., based on the type of antenna used by the UE to receive the signaling). The UE may then convert the first format to a common format (e.g., based on an omni-type antenna) before transmitting the common format of the RSRP measurement to the network node. In some examples, 912 may correspond to the first process 604 of FIG. 6 or the first process 804 of FIG. 8.

At 914, the UE may output, for transmission to the network node, a measurement of the signaling from a perspective of the receive beam. For example, 914 may be performed by the transmitting component 1040 of FIG. 10. Here, the UE may provide the network node with an indication of the measured RSRP or converted RSRP. In come examples, the beam information of 902 may be output in a same transmission as the measurement of the signaling. In some examples, 914 may correspond to the second communication 606 of FIG. 6 or the second communication 808 of FIG. 8.

Figure 10:
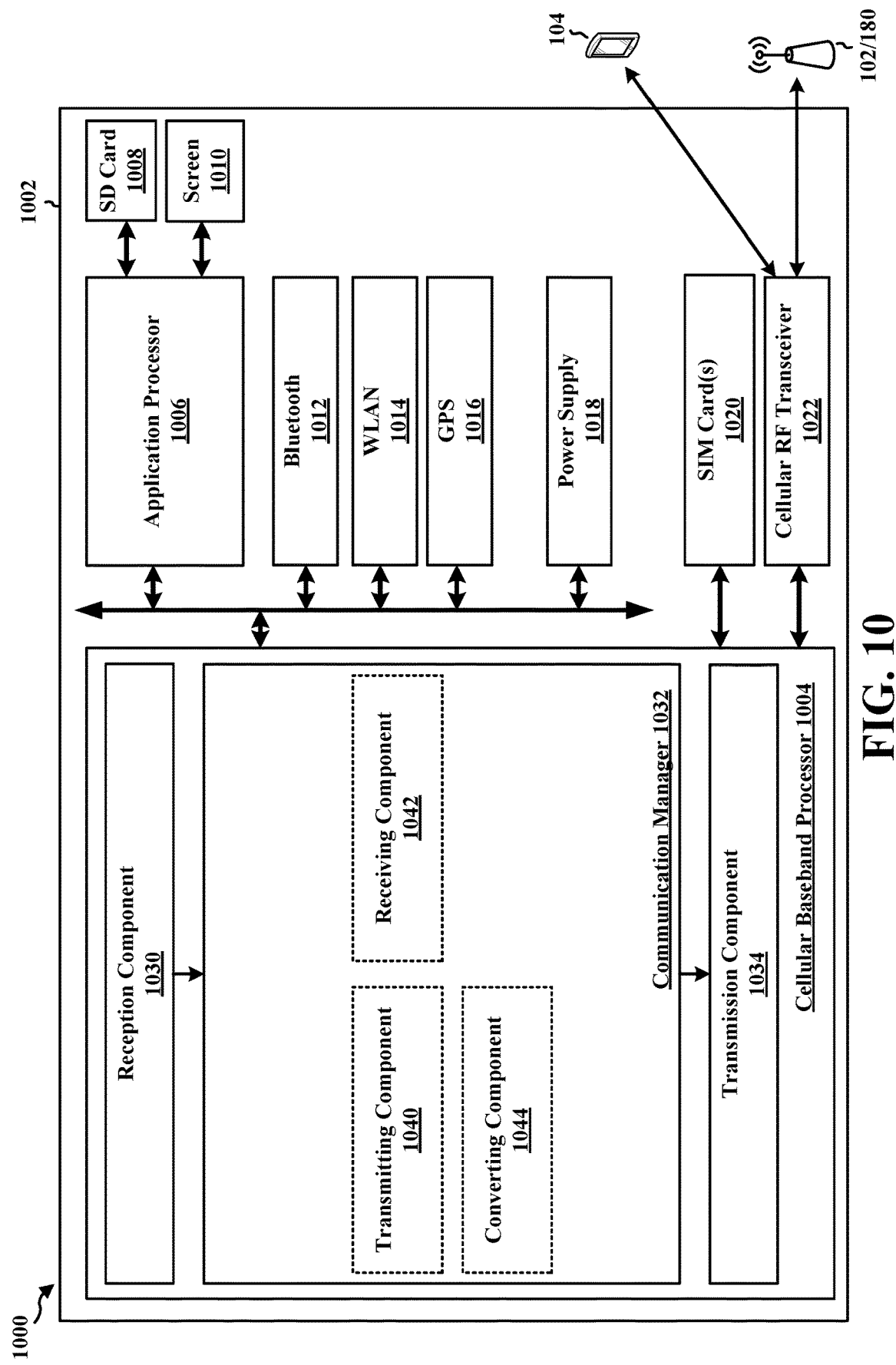
FIG. 10 is a diagram illustrating an example of a hardware implementation for an example apparatus.

FIG. 10 is a diagram 1000 illustrating an example of a hardware implementation for an apparatus 1002. The apparatus 1002 is a UE and includes a cellular baseband processor 1004 (also referred to as a modem) coupled to a cellular RF transceiver 1022 and one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, and a power supply 1018. The cellular baseband processor 1004 communicates through the cellular RF transceiver 1022 with the UE 104 and/or BS 102/180. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 104 and may include the memory 360 and/or at least one of the TX processor 368, the RX processor 356, and the controller/processor 359. In one configuration, the apparatus 1002 may be a modem chip and include just the baseband processor 1004, and in another configuration, the apparatus 1002 may be the entire UE (e.g., see 104 of FIG. 3) and include the aforediscussed additional modules of the apparatus 1002.

The communication manager 1032 includes a transmitting component 1040 that is configured to output, for transmission to a network node, beam information of a receive beam; output, for transmission to the network node, a measurement of the signaling from a perspective of the receive beam; output, for transmission to the network node, a measurement of the signaling from the perspective of the second receive beam; and output, for transmission to the network node, an error rate associated with converting the first format to the common format; e.g., as described in connection with 902, 908, 910, and 914 of FIG. 9. The communication manager 1032 further includes a receiving component 1042 configured to obtain, via a beam pair comprising the receive beam and a transmit beam, signaling from the network node; and obtain, via a second receive beam, the signaling from the network node; e.g., as described in connection with 904 and 906.

The communication manager 1032 further includes a converting component 1044 that is configured to convert the RSRP measurement of the signaling obtained via the transmit beam to the common format; e.g., as described in connection with 912 of FIG. 9.

The apparatus may include additional components that perform each of the blocks of the algorithm in the aforementioned flowchart of FIG. 9 and each of the steps illustrated in the call-flow diagrams of FIGS. 6 and 8. As such, each block in the aforementioned flowchart and call-flow diagrams may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the cellular baseband processor 1004 one or in combination with one or more other hardware/software components, includes means for outputting, for transmission to a network node, beam information of a receive beam; means for obtaining, via a beam pair comprising the receive beam and a transmit beam, signaling from the network node; means for obtaining, via a second receive beam, the signaling from the network node; means for outputting, for transmission to the network node, a measurement of the signaling from the perspective of the second receive beam; means for outputting, for transmission to the network node, an error rate associated with converting the first format to the common format; means for converting the first format to the common format; and means for outputting, for transmission to the network node, a measurement of the signaling from a perspective of the receive beam.

The aforementioned means may be one or more of the aforementioned components of the apparatus 1002 configured to perform the functions recited by the aforementioned means. As described supra, the apparatus 1002 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 11:
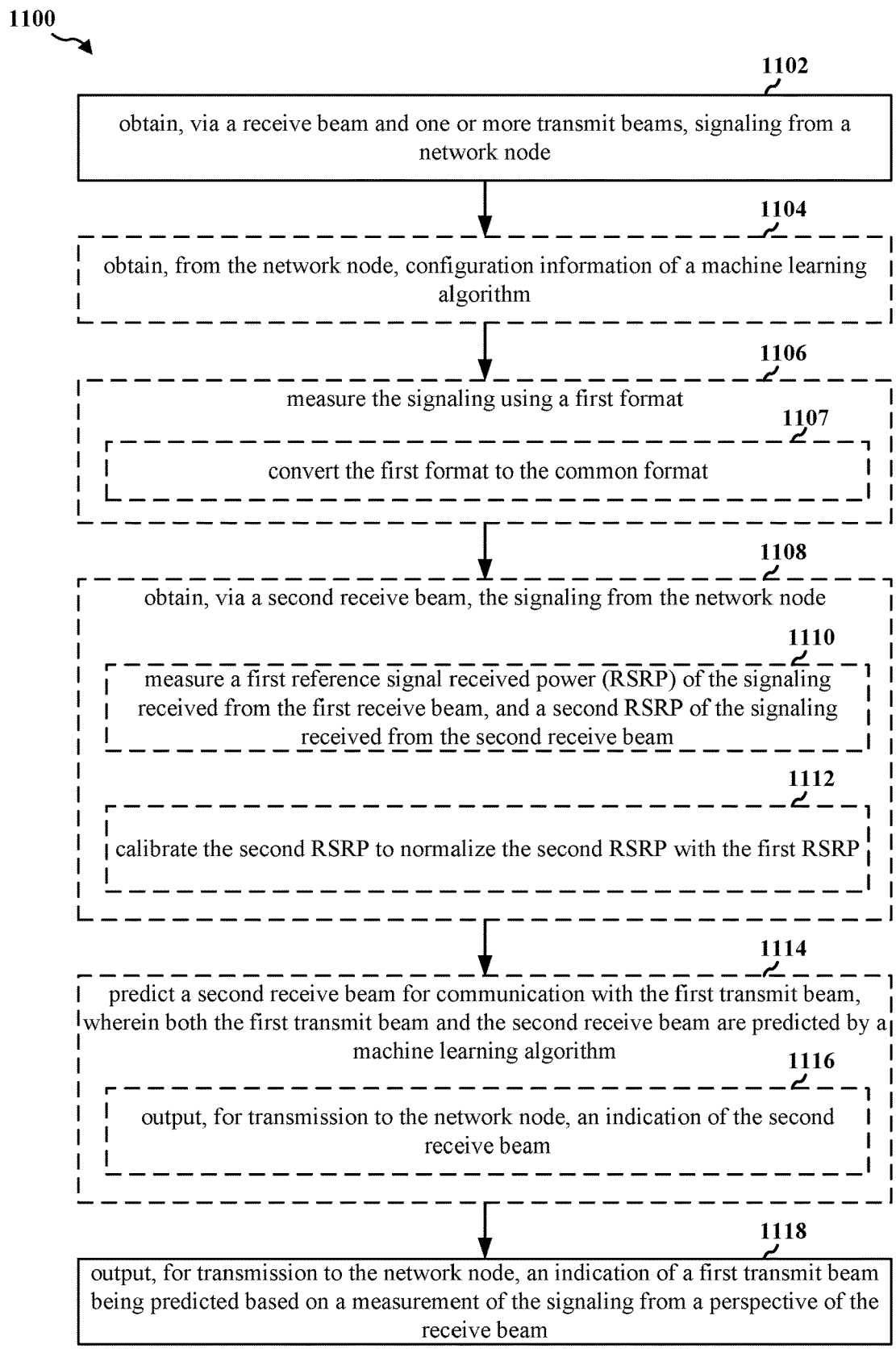
FIG. 11 is a flowchart of a method of wireless communication.

FIG. 11 is a flowchart 1100 of a method of wireless communication. The method may be performed by a UE (e.g., the UE 104; the apparatus 1202). At 1102, the UE may obtain, via a receive beam and one or more transmit beams, signaling from a network node. For example, 1102 may be performed by a receiving component 1242 of FIG. 12. Here, the signaling may include any suitable reference signal (e.g., CSI-RS or other reference signal) or SSB signal. The UE may receive the signaling via the receive beam from one or more transmit beams and measure the signaling from the perspective of the receive beam (e.g., measure an RSRP of the signaling as it is received by the receive beam). In some examples, the measurement of the signaling is defined by a common format based on an RSRP measurement of the signaling obtained via the transmit beam. For example, the common format may be a heatmap having a common reference orientation (e.g., 0 degree in Azimuth is north), wherein the reference orientation is common among the UE and the network node. In some examples, the common format is an omni-antenna RSRP measurement format. That is, the UE may measure an RSRP of the signaling using a first format (e.g., a format corresponding to the antenna type of the UE), then convert the first format to a common format that reflects what the received RSRP would be if the UE antenna receiving the signaling was an omni-antenna. For example, 1102 may correspond to receiving the first communication 602 of FIG. 6 or receiving the first communication 802 of FIG. 8.

At 1104, the UE may optionally obtain, from the network node, configuration information of a machine learning algorithm. For example, 1104 may be performed by the receiving component 1242 of FIG. 12. Here, the UE may receive a machine learning algorithm or neural network that has been developed by the network node for the UE to use for predicting a future transmit beam of the network node and/or a future receive beam of the UE, that may be used for future communications between the UE and the network node. For example, 1104 may correspond to receiving the first communication 602 of FIG. 6 or receiving the first communication 802 of FIG. 8.

At 1106, the UE may optionally measure the signaling using a first format. For example, 1106 may be performed by a measuring component 1246 of FIG. 12. Here, the UE may receive the signaling from the network node and measure the signaling to determine a reference signal received power (RSRP) of the signaling. Initially, the RSRP measurement may be a first format (e.g., based on the type of antenna used by the UE to receive the signaling). The UE, as described in 1107 below, may then convert the first format to a common format (e.g., based on an omni-type antenna) before transmitting the common format of the RSRP measurement to the network node. In some examples, 1106 may correspond to the first process 604 of FIG. 6 or the first process 804 of FIG. 8.

At 1107, the UE may optionally convert an RSRP measurement of the obtained signaling to a common format. For example, 1106 may be performed by a converting component 1244 of FIG. 12. Here, the UE may receive signaling from the network node via an antenna of the UE. That is, the UEs antenna receives the signaling. The UE may measure the RSRP as it is received from the antenna. The antenna may be a first type of antenna. The UE may then convert the RSRP from an RSRP that was measured based on a signal received from the first type of antenna to an RSRP that was measured based on a signal received from a second type of antenna (e.g., an omni antenna). In some examples, 1107 may correspond to the first process 604 of FIG. 6 or the first process 804 of FIG. 8.

At 1108, the UE may optionally obtain, via a second receive beam, the signaling from the network node. For example, 1108 may be performed by the receiving component 1242 of FIG. 12. Here, the UE may receive the same signaling transmitted from the network node via multiple receive beams. In this way, the UE may measure the same signaling across multiple receive beams to help determine a best receive beam for receiving the singling and establishing a beam pair with the transmit beam over which the signaling was transmitted. In some examples, 1106 may correspond to the first communication 602 of FIG. 6 or the first communication 802 of FIG. 8.

At 1110, the UE may optionally measure a first reference signal received power (RSRP) of the signaling received from the first receive beam, and a second RSRP of the signaling received from the second receive beam. For example, 1110 may be performed by a measuring component 1246 of FIG. 12. Here, the UE may receive the same signaling transmitted from the network node via multiple receive beams. In this way, the UE may measure the same signaling across multiple receive beams to help determine a best receive beam for receiving the singling and establishing a beam pair with the transmit beam over which the signaling was transmitted. In some examples, 1110 may correspond to the first communication 602 and first process 604 of FIG. 6 or the first communication 802 and first process 804 of FIG. 8.

At 1112, the UE may optionally calibrate the second RSRP to normalize the second RSRP with the first RSRP. For example, 1112 may be performed by a calibrating component 1248 of FIG. 12. In some examples, the UE may train its own AI/ML module with measured RSRP and other beam information, but transmit a calibrated RSRP (e.g., a common format of RSRP) and beam information to the network node 102. For example, the UE may normalize the measured RSRPs of multiple receive beams by converting the measured RSRPs to an RSRP that would be expected if each of the measured RSRPs had been received via an omni antenna. In some examples, the UE may train its own AI/ML using the normalized RSRPs. In some examples, 1112 may correspond to the first process 604 of FIG. 6 or the first process 804 of FIG. 8.

At 1114, the UE may optionally predict a second receive beam for communication with the first transmit beam, wherein both the first transmit beam and the second receive beam are predicted by a machine learning algorithm. For example, 1114 may be performed by a predicting component 1250 of FIG. 12. In some examples, the UE may use a UE-based AI/ML algorithm to predict a future transmit beam and/or a future receive beam for communication with the network node. The AI/ML algorithm may use inputs from the UE, such as: RSRP measurements, normalized RSRP measurements, etc. The AI/ML may be configured at the UE by the network node. In some examples, 1114 may correspond to the third process 810 of FIG. 8.

At 1116, the UE may optionally output, for transmission to the network node, an indication of the second receive beam. For example, 1116 may be performed by a transmitting component 1240 of FIG. 12. In some examples, the UE may provide the network node with an indication of a receive beam used to receive signaling from the network node. The network node may use the receive beam information to train an AI/ML algorithm. In some examples, 1116 may correspond to the second communication 606 of FIG. 6 or either of the second communication 808 or the third communication 812 of FIG. 8.

At 1118, the UE may output, for transmission to the network node, an indication of a first transmit beam being predicted based on a measurement of the signaling from a perspective of the receive beam. For example, 1118 may be performed by a transmitting component 1240 of FIG. 12. Here, the UE may use its AI/ML algorithm to predict a future transmit beam based on RSRP measurements of signals received from the network node. That is, the UE may input the signal measurement into the AI/ML algorithm. The UE may then transmit the predicted transmit beam to the network node. In some examples, 1118 may correspond to the third process 810 and the third communication 812 of FIG. 8.

Figure 12:
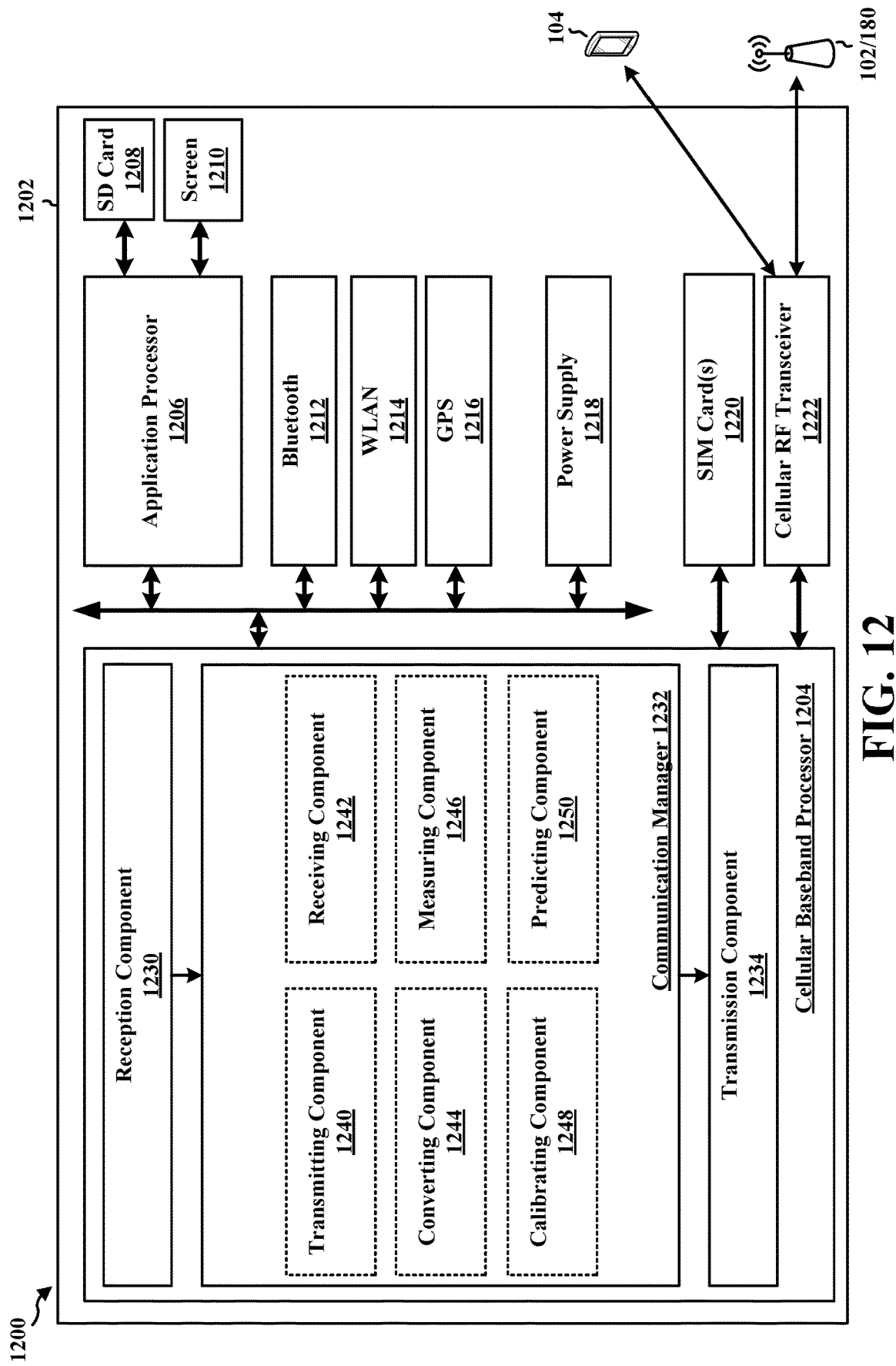
FIG. 12 is a diagram illustrating another example of a hardware implementation for another example apparatus.

FIG. 12 is a diagram 1200 illustrating an example of a hardware implementation for an apparatus 1202. The apparatus 1202 is a UE and includes a cellular baseband processor 1204 (also referred to as a modem) coupled to a cellular RF transceiver 1222 and one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, and a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 104 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 104 of FIG. 3) and include the aforediscussed additional modules of the apparatus 1202.

The communication manager 1232 includes a transmitting component 1240 that is configured to output, for transmission to the network node, an indication of the second receive beam; and output, for transmission to the network node, an indication of a first transmit beam being predicted based on a measurement of the signaling from a perspective of the receive beam; e.g., as described in connection with 1116 and 1118 of FIG. 11.

The communication manager 1232 further includes a receiving component 1242 configured to obtain, via a receive beam and one or more transmit beams, signaling from a network node; obtain, from the network node, configuration information of a machine learning algorithm; obtain, via a second receive beam, the signaling from the network node; e.g., as described in connection with 1102, 1104, and 1108.

The communication manager 1232 further includes a converting component 1244 configured to convert a reference signal received power (RSRP) measurement of the obtained signaling to the common format; e.g., as described in connection with 1107.

The communication manager 1232 further includes a measuring component 1246 configured to measure a first reference signal received power (RSRP) of the signaling received from the first receive beam, and a second RSRP of the signaling received from the second receive beam; e.g., as described in connection with 1110.

The communication manager 1232 further includes a calibrating component 1248 that is configured to calibrate the second RSRP to normalize the second RSRP with the first RSRP; e.g., as described in connection with 1112.

The communication manager 1232 further includes a predicting component 1250 that is configured to predict a second receive beam for communication with the first transmit beam, wherein both the first transmit beam and the second receive beam are predicted by a machine learning algorithm; e.g., as described in connection with 1114.

The apparatus may include additional components that perform each of the blocks of the algorithm in the aforementioned flowchart of FIG. 11 and each of the steps illustrated in the call-flow diagrams of FIGS. 6 and 8. As such, each block in the aforementioned flowchart and call-flow diagrams may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the cellular baseband processor 1204 alone or in combination with any one or more other hardware/software components, includes means for obtaining, via a receive beam, signaling from a network node, wherein the signaling is obtained via one or more transmit beams; means for obtaining, from the network node, configuration information of a machine learning algorithm; means for converting a reference signal received power (RSRP) measurement of the obtained signaling to the common format (e.g., means for converting a first format of an RSRP measurement to a common format); means for obtaining, via a second receive beam, the signaling from the network node; means for measuring: (i) a first reference signal received power (RSRP) of the signaling received from the first receive beam, and (ii) a second RSRP of the signaling received from the second receive beam; means for calibrating the second RSRP to normalize the second RSRP with the first RSRP; means for predicting a second receive beam for communication with the first transmit beam, wherein both the first transmit beam and the second receive beam are predicted by a machine learning algorithm; means for outputting, for transmission to the network node, an indication of the second receive beam; and means for outputting, for transmission to the network node, an indication of a first transmit beam being predicted based on a measurement of the signaling from a perspective of the receive beam.

The aforementioned means may be one or more of the aforementioned components of the apparatus 1202 configured to perform the functions recited by the aforementioned means. As described supra, the apparatus 1202 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 13:
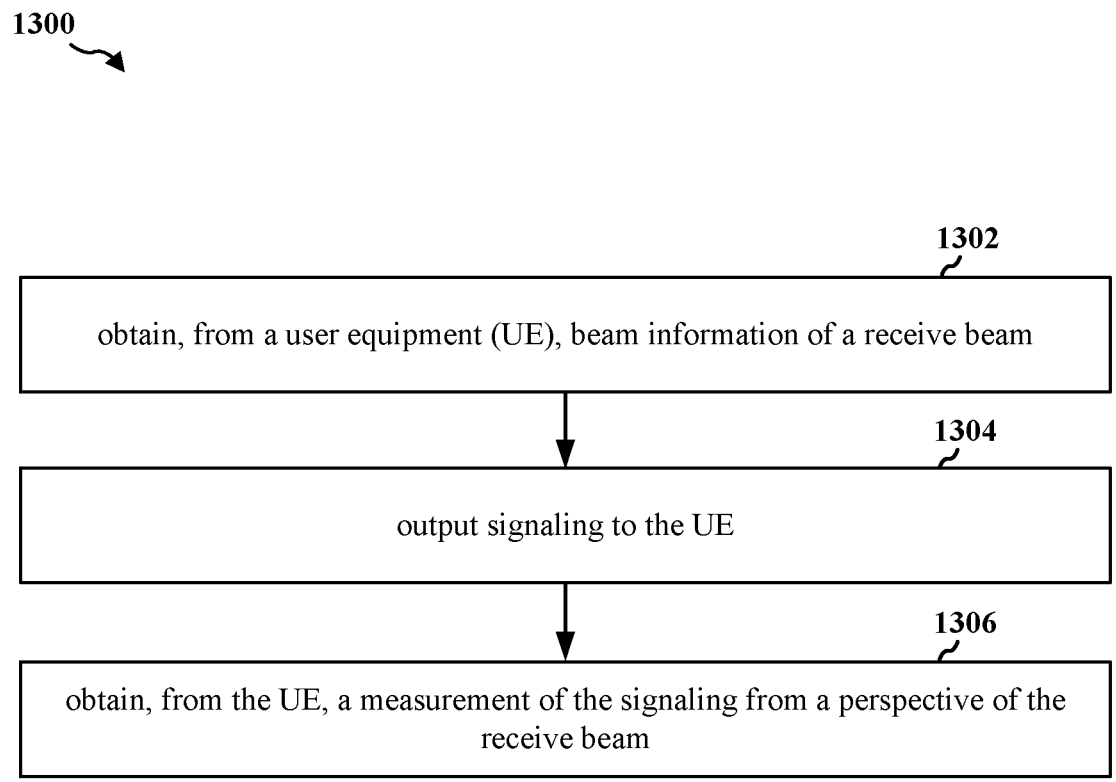
FIG. 13 is a flowchart of a method of wireless communication.

FIG. 13 is a flowchart 1300 of a method of wireless communication. The method may be performed by a base station or network node (e.g., the base station 102/180; the apparatus 1402. At 1302, the network node may obtain, from a user equipment (UE), beam information of a receive beam. For example, 1302 may be performed by a receiving component 1440. Here, the beam information may include one or more of a beam pattern of the receive beam used by the UE, an identifier of the receive beam, an orientation of the UE, and a velocity change of the UE. In some examples, the beam pattern comprises a directivity gain of the receive beam across one or more of an azimuth angle of arrival (AOA) and a zenith angle of arrival (ZOA). For example, 1302 may correspond to the second communication 606 of FIG. 6 or the second communication 808 of FIG. 8.

At 1304, the network node may output signaling to the UE. For example, 1304 may be performed by a transmitting component 1442. Here, the signaling may include any suitable reference signal (e.g., CSI-RS or other reference signal) or SSB signal. The network node may transmit the signaling via one or more transmit beams and the UE may measure the signaling from the perspective of the receive beam (e.g., measure an RSRP of the signaling as it is received by the receive beam). For example, 1304 may correspond to transmitting the first communication 602 of FIG. 6 or transmitting the first communication 802 of FIG. 8.

At 1306, the network node may obtain, from the UE, a measurement of the signaling from a perspective of the receive beam. For example, 1306 may be performed by a receiving component 1440. The UE may receive the signaling via the receive beam and measure the signaling from the perspective of the receive beam (e.g., measure an RSRP of the signaling as it is received by the receive beam). In some examples, the measurement of the signaling is defined by a common format based on an RSRP measurement of the signaling obtained via the transmit beam. For example, the common format may be a heatmap having a common reference orientation (e.g., 0 degree in Azimuth is north), wherein the reference orientation is common among the UE and the network node. In some examples, the common format is an omni-antenna RSRP measurement format. That is, the UE may measure the RSRP of the signaling, then convert the measured RSRP to a modified RSRP that reflects what the received RSRP would be if the UE antenna receiving the signaling was an omni-antenna. For example, 1306 may correspond to receiving the second communication 606 of FIG. 6 or the second communication 808 of FIG. 8.

In certain aspects, the beam information and the measurement of the signaling are obtained in a same communication.

In certain aspects, the beam information comprises one or more of a beam pattern of the receive beam, an identifier of the receive beam, an orientation of the UE, and a velocity change of the UE.

In certain aspects, the beam pattern comprises a directivity gain of the receive beam across one or more of an azimuth angle of arrival (AOA) and a zenith angle of arrival (ZOA).

Figure 14:
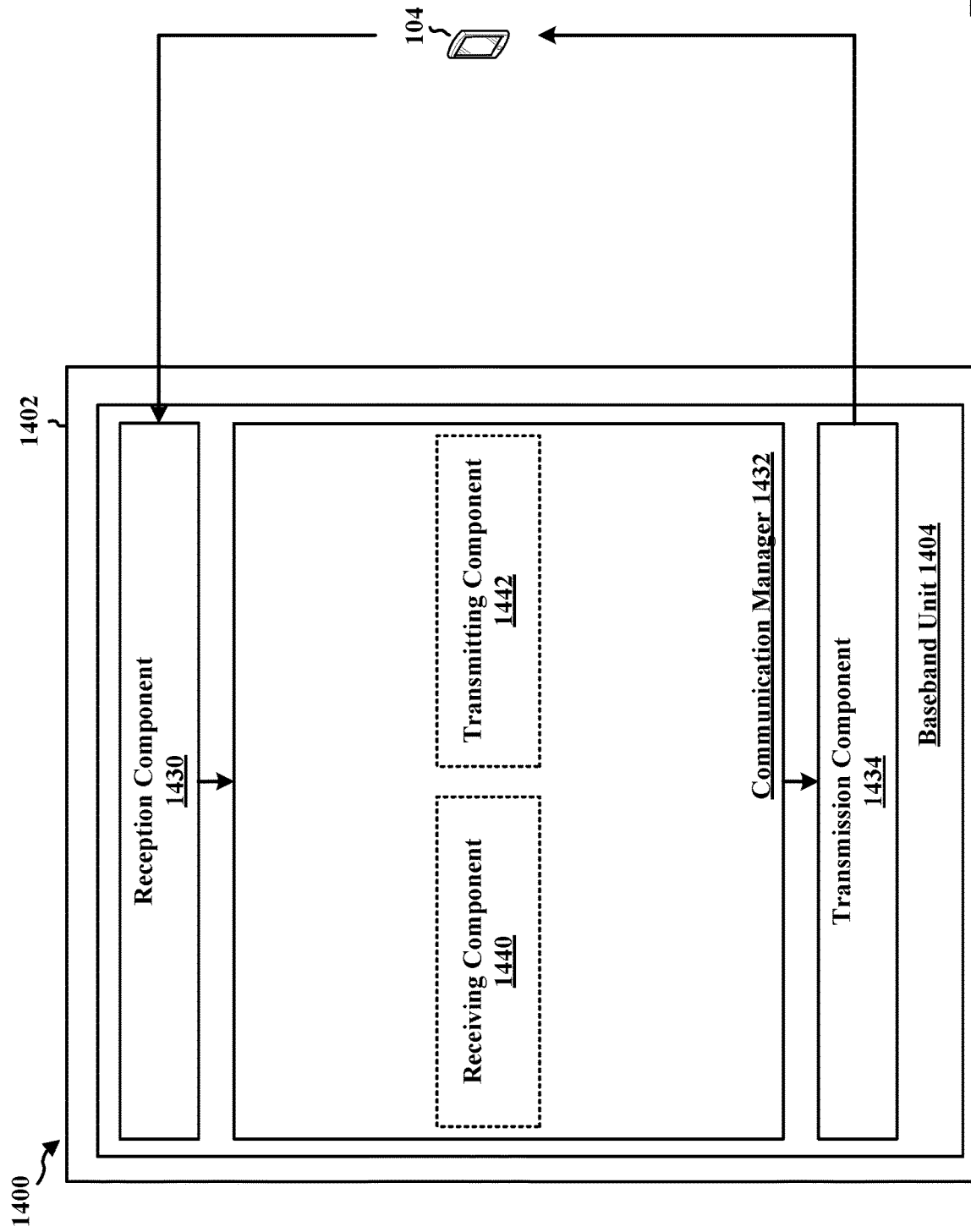
FIG. 14 is a diagram illustrating another example of a hardware implementation for another example apparatus.

FIG. 14 is a diagram 1400 illustrating an example of a hardware implementation for an apparatus 1402. The apparatus 1402 is a network node or BS and includes a baseband unit 1404. The baseband unit 1404 may communicate through a cellular RF transceiver with the UE 104. The baseband unit 1404 may include a computer-readable medium/memory. The baseband unit 1404 is responsible for general processing, including the execution of software stored on the computer-readable medium/memory. The software, when executed by the baseband unit 1404, causes the baseband unit 1404 to perform the various functions described supra. The computer-readable medium/memory may also be used for storing data that is manipulated by the baseband unit 1404 when executing software. The baseband unit 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband unit 1404. The baseband unit 1404 may be a component of the BS 102 and may include the memory 376 and/or at least one of the TX processor 316, the RX processor 370, and the controller/processor 375.

The communication manager 1432 includes a receiving component 1440 that is configured to obtain, from a user equipment (UE), beam information of a receive beam; and obtain, from the UE, a measurement of the signaling from a perspective of the receive beam; e.g., as described in connection with 1302 and 1306.

The communication manager 1432 further includes a transmitting component 1442 that is configured to output signaling to the UE; e.g., as described in connection with 1304.

The apparatus may include additional components that perform each of the blocks of the algorithm in the aforementioned flowchart of FIG. 13 and the steps of call flow diagrams of FIGS. 6 and 8. As such, each block in the aforementioned flowchart and call-flow diagrams may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the baseband unit 1404, includes means for obtaining, from a user equipment (UE), beam information of a receive beam; means for outputting signaling to the UE; and means for obtaining, from the UE, a measurement of the signaling from a perspective of the receive beam.

The aforementioned means may be one or more of the aforementioned components of the apparatus 1402 configured to perform the functions recited by the aforementioned means. As described supra, the apparatus 1402 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 15:
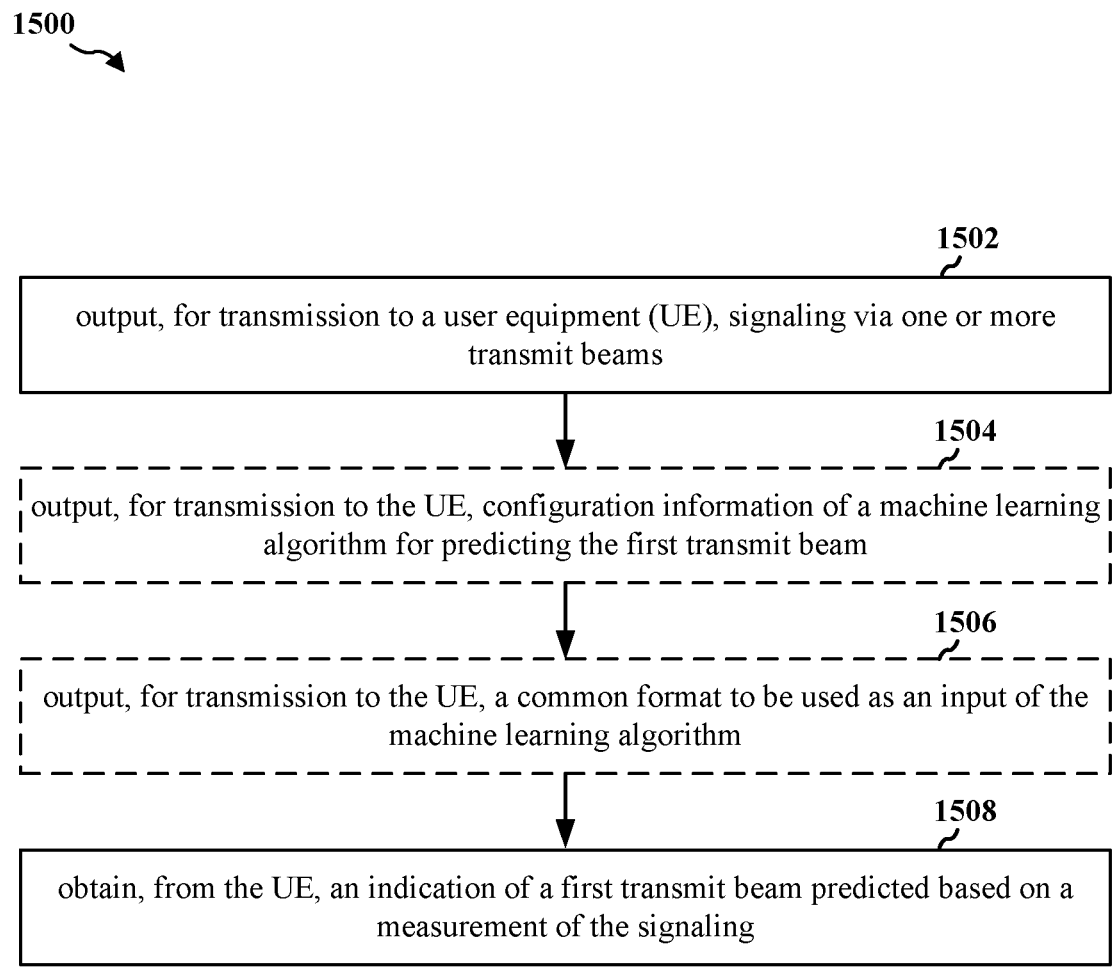
FIG. 15 is a flowchart of a method of wireless communication.

FIG. 15 is a flowchart 1500 of a method of wireless communication. The method may be performed by a base station or network node (e.g., the base station 102/180; the apparatus 1602. At 1502, the network node may output, for transmission to a user equipment (UE), signaling via one or more transmit beams. For example, 1502 may be performed by a transmitting component 1642.

At 1504, the network node may optionally output, for transmission to the UE, configuration information of a machine learning algorithm for predicting the first transmit beam. For example, 1502 may be performed by the transmitting component 1642.

At 1506, the network node may optionally output, for transmission to the UE, a common format to be used as an input of the machine learning algorithm. For example, 1506 may be performed by the transmitting component 1642.

At 1508, the network node may obtain, from the UE, an indication of a first transmit beam predicted based on a measurement of the signaling. For example, 1508 may be performed by a receiving component 1640.

Figure 16:
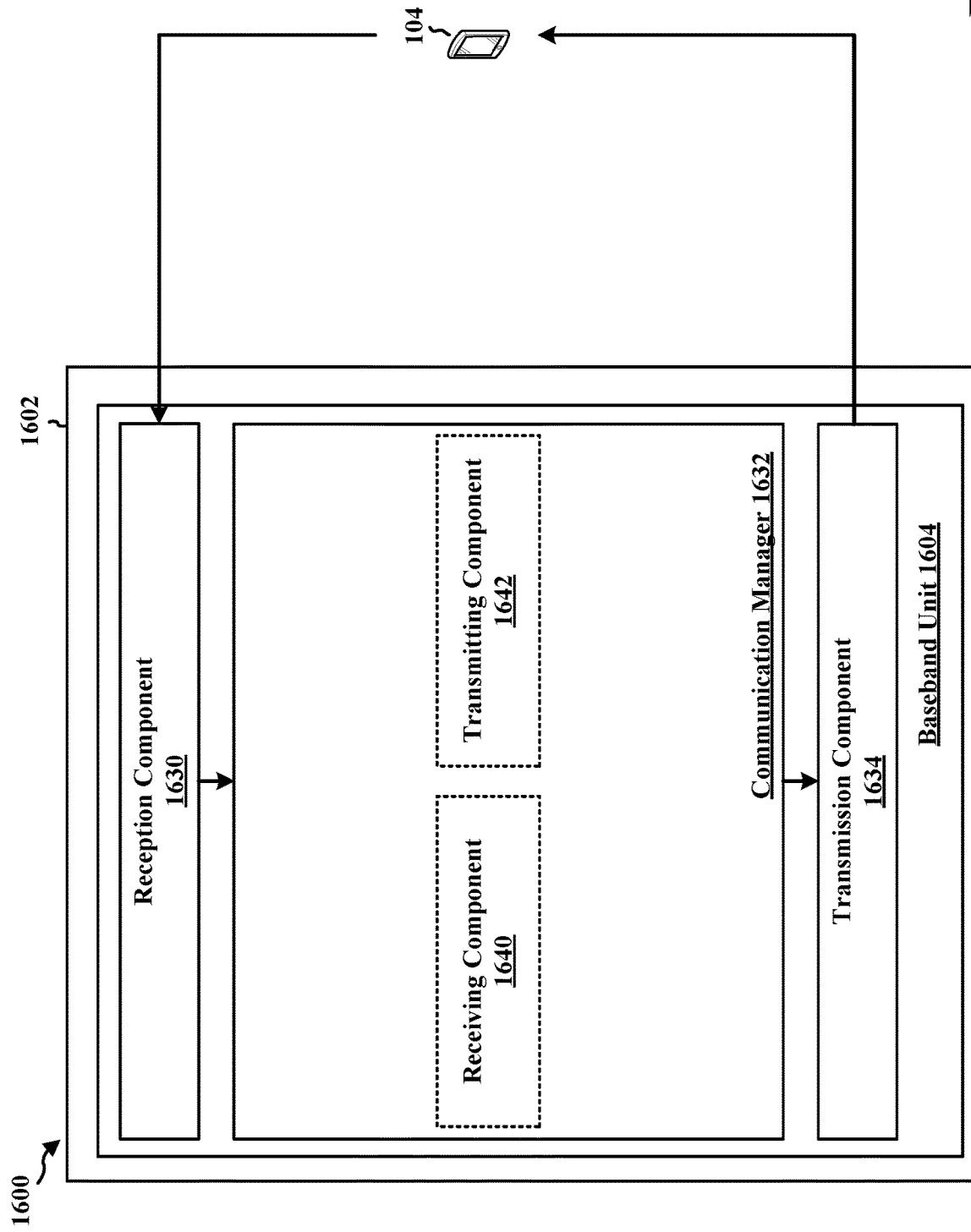
FIG. 16 is a diagram illustrating another example of a hardware implementation for another example apparatus.

FIG. 16 is a diagram 1600 illustrating an example of a hardware implementation for an apparatus 1602. The apparatus 1602 is a BS or network node and includes a baseband unit 1604. The baseband unit 1604 may communicate through a cellular RF transceiver with the UE 104. The baseband unit 1604 may include a computer-readable medium/memory. The baseband unit 1604 is responsible for general processing, including the execution of software stored on the computer-readable medium/memory. The software, when executed by the baseband unit 1604, causes the baseband unit 1604 to perform the various functions described supra. The computer-readable medium/memory may also be used for storing data that is manipulated by the baseband unit 1604 when executing software. The baseband unit 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the baseband unit 1604. The baseband unit 1604 may be a component of the BS 102 and may include the memory 376 and/or at least one of the TX processor 316, the RX processor 370, and the controller/processor 375.

The communication manager 1632 includes a receiving component 1640 configured to obtain, from the UE, an indication of a first transmit beam predicted based on a measurement of the signaling; e.g., as described in connection with 1508.

The communication manager 1632 further includes a transmitting component 1642 configured to output, for transmission to a user equipment (UE), signaling via one or more transmit beams; output, for transmission to the UE, configuration information of a machine learning algorithm for predicting the first transmit beam; and output, for transmission to the UE, a common format to be used as an input of the machine learning algorithm; e.g., as described in connection with 1502, 1504, and 1506.

The apparatus may include additional components that perform each of the blocks of the algorithm in the aforementioned flowchart of FIG. 15 and the steps of call flow diagrams 6 and 8. As such, each block in the aforementioned flowchart and call flow diagrams may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1602, and in particular the baseband unit 1604, includes means for outputting, for transmission to a user equipment (UE), signaling via one or more transmit beams; means for outputting, for transmission to the UE, configuration information of a machine learning algorithm for predicting the first transmit beam; means for outputting, for transmission to the UE, a common format to be used as an input of the machine learning algorithm; and means for obtaining, from the UE, an indication of a first transmit beam predicted based on a measurement of the signaling.

The aforementioned means may be one or more of the aforementioned components of the apparatus 1602 configured to perform the functions recited by the aforementioned means. As described supra, the apparatus 1602 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Additional Considerations

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Example Aspects

The following examples are illustrative only and may be combined with aspects of other embodiments or teachings described herein, without limitation.

Example 1 is a method for wireless communication at a user equipment (UE), comprising: outputting, for transmission to a network node, beam information of a receive beam; obtaining, via a beam pair comprising the receive beam and a transmit beam, signaling from the network node; and outputting, for transmission to the network node, a measurement of the signaling from a perspective of the receive beam.

Example 2 is the method of example 1, wherein the beam information and the measurement of the signaling are output for transmission in a same communication.

Example 3 is the method of any of examples 1 and 2, wherein the beam information comprises one or more of a beam pattern of the receive beam, an identifier of the receive beam, an orientation of the UE, and a velocity change of the UE.

Example 4 is the method of example 3, wherein the beam pattern comprises a directivity gain of the receive beam across one or more of an azimuth angle of arrival (AOA) and a zenith angle of arrival (ZOA).

Example 5 is the method of any of examples 1-4, wherein the receive beam is a first receive beam, and wherein the method further comprises: obtaining, via a second receive beam, the signaling from the network node; and outputting, for transmission to the network node, a measurement of the signaling from the perspective of the second receive beam.

Example 6 is the method of any of examples 1-5, wherein the measurement of the signaling is a reference signal received power (RSRP) measurement formatted using a common format, and wherein, prior to the output of the measurement for transmission to the network node, the one or more processors are further configured to: measure the signaling using a first format; and convert the first format to the common format.

Example 7 is the method of example 6, wherein the common format is a heatmap having a common reference orientation.

Example 8 is the method of example 6, wherein the common format is an omni-antenna RSRP measurement format.

Example 9 is the method of example 6, wherein the method further comprises: outputting, for transmission to the network node, an error rate associated with converting the first format to the common format.

Example 10 is a method for wireless communication at a user equipment (UE), comprising: obtaining, via a receive beam, signaling from a network node, wherein the signaling is obtained via one or more transmit beams; and outputting, for transmission to the network node, an indication of a first transmit beam being predicted based on a measurement of the signaling from a perspective of the receive beam.

Example 11 is the method of example 10, wherein the method further comprises: obtaining, from the network node, configuration information of a machine learning algorithm.

Example 12 is the method of any of examples 10 and 11, wherein the receive beam is a first receive beam, and wherein the method further comprises: obtaining, via a second receive beam, the signaling from the network node; measuring: (i) a first reference signal received power (RSRP) of the signaling received from the first receive beam, and (ii) a second RSRP of the signaling received from the second receive beam; and calibrating the second RSRP to normalize the second RSRP with the first RSRP.

Example 13 is the method of any of examples of 10-12, wherein the first transmit beam is predicted by a machine learning algorithm that uses beam information of the receive beam.

Example 14 is the method of example 13, wherein the beam information comprises one or more of a beam pattern of the receive beam, an identifier of the receive beam, an orientation of the UE, and a velocity change of the UE.

Example 15 is the method of example 14, wherein the beam pattern comprises a directivity gain of the receive beam across one or more of an azimuth angle of arrival (AOA) and a zenith angle of arrival (ZOA).

Example 16 is the method of any of examples 10-15, wherein the first transmit beam is predicted by a machine learning algorithm, and wherein an input of the machine learning algorithm is defined by a common format predefined or indicated by the network node.

Example 17 is the method of example 16, wherein the common format is a heatmap having a common reference orientation.

Example 18 is the method of example 16, wherein the common format is an omni-antenna RSRP measurement format, and wherein the one or more processors are further configured to: convert a reference signal received power (RSRP) measurement of the obtained signaling to the common format.

Example 19 is the method of example 18, wherein the machine learning algorithm is configured with a conversion error used for predicting the first transmit beam.

Example 20 is the method of any of examples 10-19, wherein the indication of the first transmit beam comprises one or more of an RSRP associated with the first transmit beam or a beam identifier of the first transmit beam.

Example 21 is the method of any of examples 10-20, wherein the receive beam is a first receive beam, and wherein the method further comprises: predicting a second receive beam for communication with the first transmit beam, wherein both the first transmit beam and the second receive beam are predicted by a machine learning algorithm; and outputting, for transmission to the network node, an indication of the second receive beam.

Example 22 is method for wireless communication at a network node, comprising: obtaining, from a user equipment (UE), beam information of a receive beam; outputting signaling to the UE; and obtaining, from the UE, a measurement of the signaling from a perspective of the receive beam.

Example 23 is the method of example 22, wherein the beam information is obtained in a same transmission as the measurement of the signaling.

Example 24 is the method of any of examples 22 and 23, wherein the beam information comprises one or more of a beam pattern of the receive beam, an identifier of the receive beam, an orientation of the UE, and a velocity change of the UE.

Example 25 is the method of example 24, wherein the beam pattern comprises a directivity gain of the receive beam across one or more of an azimuth angle of arrival (AOA) and a zenith angle of arrival (ZOA).

Example 26 is a method for wireless communication by a network node, comprising: outputting, for transmission to a user equipment (UE), signaling via one or more transmit beams; and obtaining, from the UE, an indication of a first transmit beam predicted based on a measurement of the signaling.

Example 27 is a method of example 26, wherein the method further comprises: outputting, for transmission to the UE, configuration information of a machine learning algorithm for predicting the first transmit beam.

Example 28 is the method of example 27, wherein the first transmit beam is predicted by the machine learning algorithm, and wherein the method further comprises: outputting, for transmission to the UE, a common format to be used as an input of the machine learning algorithm.

Example 29 is a UE, comprising: a transceiver; a memory comprising instructions; and one or more processors configured to execute the instructions to cause the UE to perform a method in accordance with any one of examples 1-9, wherein the transceiver is configured to: transmit the beam information of the receive beam; receive signaling from the network node; and transmit the measurement of the signaling.

Example 30 is a UE, comprising: a transceiver; a memory comprising instructions; and one or more processors configured to execute the instructions to cause the UE to perform a method in accordance with any one of examples 10-21, wherein the transceiver is configured to: receive signaling from the network node; and transmit the indication of the first transmit beam.

Example 31 is a network node, comprising: a transceiver; a memory comprising instructions; and one or more processors configured to execute the instructions and cause the network node to perform a method in accordance with any one of examples 22-25, wherein the transceiver is configured to: receive the beam information; transmit the signaling to the UE; and receive the measurement of the signaling.

Example 32 is a network node, comprising: a transceiver; a memory comprising instructions; and one or more processors configured to execute the instructions and cause the network node to perform a method in accordance with any one of examples 26-28, wherein the transceiver is configured to: transmit the signaling; and receive the indication of the first transmit beam.

Example 33 is an apparatus for wireless communications, comprising means for performing a method in accordance with any one of examples 1-9.

Example 34 is an apparatus for wireless communications, comprising means for performing a method in accordance with any one of examples 10-21.

Example 35 is an apparatus for wireless communications, comprising means for performing a method in accordance with any one of examples 22-25.

Example 36 is an apparatus for wireless communications, comprising means for performing a method in accordance with any one of examples 26-28.

Example 37 is a non-transitory computer-readable medium comprising instructions that, when executed by an apparatus, cause the apparatus to perform a method in accordance with any one of examples 1-9.

Example 38 is a non-transitory computer-readable medium comprising instructions that, when executed by an apparatus, cause the apparatus to perform a method in accordance with any one of examples 10-21.

Example 39 is a non-transitory computer-readable medium comprising instructions that, when executed by an apparatus, cause the apparatus to perform a method in accordance with any one of examples 22-25.

Example 40 is a non-transitory computer-readable medium comprising instructions that, when executed by an apparatus, cause the apparatus to perform a method in accordance with any one of examples 26-28.

Example 41 is an apparatus for wireless communications, comprising: a memory comprising instructions; and one or more processors configured to execute the instructions to cause the apparatus to perform a method in accordance with any one of examples 1-9.

Example 42 is apparatus for wireless communications, comprising: a memory comprising instructions; and one or more processors configured to execute the instructions to cause the apparatus to perform a method in accordance with any one of examples 10-21.

Example 43 is an apparatus for wireless communications, comprising: a memory comprising instructions; and one or more processors configured to execute the instructions to cause the apparatus to perform a method in accordance with any one of examples 22-25.

Example 44 is apparatus for wireless communications, comprising: a memory comprising instructions; and one or more processors configured to execute the instructions to cause the apparatus to perform a method in accordance with any one of examples 26-28.

What is claimed is:

1. An apparatus configured for wireless communication, comprising:
    one or more memories, individually or in combination, having instructions; and
    one or more processors, individually or in combination, configured to execute the instructions and cause the apparatus to:
        output, for transmission to a network node, beam information associated with a receive beam;
        obtain, via a beam pair comprising the receive beam and a transmit beam, signaling from the network node;
        measure the signaling;
        convert the measurement of the signaling from a first format to a second format that is to be used by at least one of an artificial intelligence (AI) model or a machine learning (ML) model; and
        output, for transmission to the network node, an indication of the converted measurement of the signaling and an error rate associated with converting the first format to the second format.

2. The apparatus of claim 1, wherein the beam information and the measurement of the signaling are output for transmission in a same communication.

3. The apparatus of claim 1, wherein the beam information comprises one or more of a beam pattern of the receive beam, an identifier of the receive beam, an orientation of the apparatus, and a velocity change of the apparatus.

4. The apparatus of claim 3, wherein the beam pattern comprises a directivity gain of the receive beam across one or more of an azimuth angle of arrival (AOA) and a zenith angle of arrival (ZOA).

5. The apparatus of claim 1, wherein the receive beam is a first receive beam, and wherein the one or more processors are further configured to cause the apparatus to:
    obtain, via a second receive beam, the signaling from the network node; and
    output, for transmission to the network node, a measurement of the signaling from a perspective of the second receive beam.

6. The apparatus of claim 1, wherein the measurement of the signaling is a reference signal received power (RSRP) measurement, and wherein the second format is common to the apparatus and the network node.

7. The apparatus of claim 1, wherein the second format is a heatmap having a common reference orientation.

8. The apparatus of claim 1, wherein the second format is an omni-antenna RSRP measurement format.

9. The apparatus of claim 1, further comprising a transceiver configured to:
    transmit the beam information;
    receive the signaling from the network node; and
    transmit the measurement of the signaling, wherein the apparatus is configured as a user equipment (UE).

10. The apparatus of claim 1, wherein the second format is common to the apparatus and the network node.

11. An apparatus configured for wireless communication, comprising:

one or more memories, individually or in combination, having instructions; and one or more processors, individually or in combination, configured to execute the instructions and cause the apparatus to:
- obtain, from a user equipment (UE), beam information associated with a receive beam;
- output signaling to the UE;
- obtain, from the UE, a measurement of the signaling from a perspective of the receive beam, the measurement of the signaling being a format that is to be used by at least one of an artificial intelligence (AI) model or a machine learning (ML) model; and
- obtain, from the UE, an error rate associated with conversion of the measurement of the signaling to the format.

12. The apparatus of claim 11, wherein the beam information and the measurement of the signaling are obtained in a same communication.

13. The apparatus of claim 11, wherein the beam information comprises one or more of a beam pattern of the receive beam, an identifier of the receive beam, an orientation of the UE, and a velocity change of the UE.

14. The apparatus of claim 13, wherein the beam pattern comprises a directivity gain of the receive beam across one or more of an azimuth angle of arrival (AOA) and a zenith angle of arrival (ZOA).

15. The apparatus of claim 11, further comprising a transceiver configured to:
- receive the beam information;
- transmit signaling to the UE; and
- obtain the measurement of the signaling, wherein the apparatus is configured as a network node.

16. The apparatus of claim 11, wherein the format is common to the apparatus and the UE.

17. An apparatus configured for wireless communication, comprising:

one or more memories, individually or in combination, having instructions; and one or more processors, individually or in combination, configured to execute the instructions and cause the apparatus to:
- obtain, from a network node, configuration information associated with at least one of an artificial intelligence (AI) model or machine learning (ML) model common to the apparatus and the network node;
- obtain, via a receive beam and one or more transmit beams, signaling from the network node;
- measure the signaling from a perspective of the receive beam, wherein the receive beam is a first receive beam, wherein the measurement of the signaling is a measurement of a first reference signal received power (RSRP) of the signaling obtained via the first receive beam;
- obtain, via a second receive beam, the signaling from the network node;
- measure a second RSRP of the signaling received via the second receive beam;
- calibrate the second RSRP to normalize the second RSRP with the first RSRP;
- predict, via the at least one of the AI model or the ML model, a first transmit beam, wherein the prediction is based on the first RSRP and the normalized second RSRP; and
- output, for transmission to the network node, an indication of the first transmit beam.

18. The apparatus of claim 17, further comprising a transceiver configured to:
- receive the signaling from the network node; and
- transmit the indication of the first transmit beam, wherein the apparatus is configured as a user equipment (UE).

* * * * *